(12) United States Patent
Oliver et al.

(10) Patent No.: US 9,727,751 B2
(45) Date of Patent: Aug. 8, 2017

(54) METHOD AND APPARATUS FOR APPLYING PRIVACY POLICIES TO STRUCTURED DATA

(75) Inventors: Ian Justin Oliver, Söderkulla (FI); Sergey Boldyrev, Söderkulla (FI); Jari-Jukka Harald Kaaja, Järvenpää (FI); Joni Jorma Marius Jantunen, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 535 days.

(21) Appl. No.: 12/916,009

(22) Filed: Oct. 29, 2010

(65) Prior Publication Data

US 2012/0110680 A1    May 3, 2012

(51) Int. Cl.
*G06F 21/62* (2013.01)
*H04L 29/06* (2006.01)

(52) U.S. Cl.
CPC ........ *G06F 21/6245* (2013.01); *H04L 63/102* (2013.01)

(58) Field of Classification Search
CPC .......................... G06F 21/6245; H04L 63/102
USPC ............................................................ 726/30
See application file for complete search history.

(56) References Cited

U.S. PATENT DOCUMENTS

| | | | |
|---|---|---|---|
| 6,125,447 A * | 9/2000 | Gong ..................... | G06F 9/468 713/154 |
| 6,430,561 B1 * | 8/2002 | Austel ................. | G06F 21/6218 |
| 6,499,031 B1 * | 12/2002 | Hopmann et al. | |
| 7,401,352 B2 | 7/2008 | Duri et al. | |
| 7,441,119 B2 | 10/2008 | Brabson et al. | |
| 7,533,264 B2 | 5/2009 | Ballinger et al. | |
| 8,390,456 B2 * | 3/2013 | Puleston ............. | G06K 7/0008 340/10.1 |
| 2002/0118097 A1 * | 8/2002 | Heinrich .............. | G06K 7/0008 340/10.32 |
| 2003/0126464 A1 * | 7/2003 | McDaniel et al. ............ 713/201 | |

(Continued)

FOREIGN PATENT DOCUMENTS

| | | |
|---|---|---|
| EP | 1396979 A2 | 3/2004 |
| EP | 1 860 589 A1 | 11/2007 |
| WO | WO 98/26535 A1 | 6/1998 |
| WO | WO 03/001402 A | 1/2003 |
| WO | WO 2008/128926 A1 | 10/2008 |

OTHER PUBLICATIONS

Kriplean et al., Physical Access Control for Captured RFID Data, Oct. 2007, IEEE Pervasive Computing, vol. 6, No. 4, pp. 48-55.*

(Continued)

*Primary Examiner* — Kenneth Chang
(74) *Attorney, Agent, or Firm* — Ditthavong & Steiner, P.C.

(57) ABSTRACT

An approach is provided for applying privacy policies to structured data. A privacy policy management infrastructure receives a request for an exchange of structured data among a plurality of devices. The privacy policy management infrastructure determines one or more elements of the structured data. The privacy policy management infrastructure also determines one or more privacy policies corresponding to the structured data, respective ones of the one or more elements, or a combination thereof. The privacy policy management infrastructure further determines to apply the one or more privacy policies to the structured data, respective ones of the one or more elements, or a combination thereof when initiating the exchange.

20 Claims, 18 Drawing Sheets

(56) References Cited

U.S. PATENT DOCUMENTS

| | | | |
|---|---|---|---|
| 2004/0122958 A1* | 6/2004 | Wardrop | 709/229 |
| 2004/0215650 A1* | 10/2004 | Shaji et al. | 707/102 |
| 2005/0021995 A1* | 1/2005 | Lal et al. | 713/200 |
| 2005/0099268 A1* | 5/2005 | Juels | G06K 7/10019 340/10.4 |
| 2006/0070129 A1* | 3/2006 | Sobel et al. | 726/23 |
| 2006/0206931 A1* | 9/2006 | Dillaway et al. | 726/9 |
| 2006/0248045 A1* | 11/2006 | Toledano et al. | 707/2 |
| 2006/0294192 A1* | 12/2006 | Mao et al. | 709/213 |
| 2007/0040654 A1* | 2/2007 | Lee | G07C 9/00111 340/10.1 |
| 2007/0277230 A1* | 11/2007 | Hawkins et al. | 726/4 |
| 2008/0140572 A1* | 6/2008 | Jackson | G06F 19/323 705/51 |
| 2008/0141339 A1* | 6/2008 | Gomez et al. | 726/1 |
| 2008/0155257 A1* | 6/2008 | Werner | H04L 9/3226 713/168 |
| 2008/0229428 A1* | 9/2008 | Camiel | G06F 17/30082 726/27 |
| 2008/0282081 A1* | 11/2008 | Patiejunas | 713/153 |
| 2009/0154699 A1 | 6/2009 | Tserkovny et al. | |
| 2010/0201498 A1* | 8/2010 | Griffin | G06F 21/32 340/10.52 |
| 2011/0277038 A1* | 11/2011 | Sahita | G06F 21/6281 726/27 |

OTHER PUBLICATIONS

Matheus, Andreas, How to declare access control policies for XML structured information objects using OASIS' eXtensible Access Control Markup Language (XACML), 2005, Munich, Germany, http://origin-www.computer.org/plugins/dl/pdf/proceedings/hicss/2005/2268/07/22680168a.pd?template=1&loginState=1&userData=anonymous-IP%253A%253AAddress%253A%2B203.8.109.15%252C%2B%255B172.16.161.5%252C%2B203.8.109.15%252C%2B127.0.0.1%255D, pp. 1-10.

Reagle, Joseph et al., The Platform for Privacy Preferences, 1998, AT&T and the Massachusetts Institute of Technology, http://www.w3.org/TR/NOTE-P3P-CACM, pp. 1-16.

U.S. Appl. No. 12/552,094, filed Sep. 1. 2009, Sergey Boldyrev et al.

U.S. Appl. No. 12/621,844, filed Nov. 19, 2009, Sergey Boldyrev et al.

U.S. Appl. No. 12/696,873, filed Jan. 29, 2010, Sergey Boldyrev et al.

U.S. Appl. No. 12/790,367, filed May 28, 2010, Sergey Boldyrev et al.

U.S. Appl. No. 12/824,111, filed Jun. 25, 2010, Sergey Boldyrev et al.

U.S. Appl. No. 12/916,009, filed Oct. 29, 2010, Ian Justin Oliver et al.

U.S. Appl. No. 61/324,588, filed Apr. 15, 2010, Jarmo Tapani Arponen et al.

U.S. Appl. No. 61/387,252, filed Sep. 28, 2010, Ian Justin Oliver et al.

Radio Frequency Identification (RFID) Coordinated European Standards Organizations' response to Phase 1 of EU Mandate M436, Draft ETSI TR 1XX XXX V0.0.6 (Jul. 2010), http://www.cen.eu/cen/Sectors/Sectors/ISSS/Documents/RFID-DTR07044v006-draft-for-public-comments.pdf, pp. 1-102.

Technical Guidelines RFID as Templates for the PIA-Framework, Kelter et al., 2010, https://www.bsi.bund.de/cae/servlet/contentblob/1130780/publication File/92675/TG_RFID_Templates_for_PIA_Framework_pdf.pdf, pp. 1-27.

* cited by examiner

METHOD AND APPARATUS FOR APPLYING PRIVACY POLICIES TO STRUCTURED DATA

BACKGROUND

Mobile devices with various methods of connectivity are now for many people becoming the primary gateway to the internet and also a major storage point for personal information. This is in addition to the normal range of personal computers and furthermore sensor devices plus internet based providers. Combining these devices together and lately the applications (e.g., including user interface elements of these applications) and the information stored by those applications is a major challenge of interoperability. Consequently, manufacturers of mobile devices (e.g., cellular phones) are challenged to continually improve information privacy in smaller and variable form factors, to ensure data privacy while providing ubiquitous access to data and/or internet connections over, for instance, cellular data connections.

At the same time, there has been development of distributed systems for managing information and related applications and/or processes and providing access to a wide range of a user's own information and potentially any information that has been shared to the user, wherein a user may be a person, a group of people, or some other entity or collection of entities. Additionally, these distributed systems facilitate interaction with information sources through the use of mobile wireless devices and support collaborative operations on shared data representations. The computers in a distributed system environment may communicate with other participants in the system and provide requested information through transmission of information as text, speech and visual displays.

However, despite the fact that information accessible by users can be distributed with different levels of granularity, still there is a challenge to achieve information privacy within heterogeneous network environments, wherein information with various levels of granularity and various structures is provided by and transmitted among various independent sources.

SOME EXAMPLE EMBODIMENTS

Therefore, there is a need for an approach for applying privacy policies to structured data prior to the transmission and/or reception of the data.

According to one embodiment, a method comprises receiving a request for an exchange of structured data among a plurality of devices. The method also comprises determining one or more elements of the structured data. The method further comprises determining one or more privacy policies corresponding to the structured data, respective ones of the one or more elements, or a combination thereof. The method also comprises determining to apply the one or more privacy policies to the structured data, respective ones of the one or more elements, or a combination thereof when initiating the exchange.

According to another embodiment, an apparatus comprises at least one processor, and at least one memory including computer program code, the at least one memory and the computer program code configured to, with the at least one processor, cause, at least in part, the apparatus to receive a request for an exchange of structured data among a plurality of devices. The apparatus is also caused to determine one or more elements of the structured data. The apparatus is further caused to determine one or more privacy policies corresponding to the structured data, respective ones of the one or more elements, or a combination thereof. The apparatus is also caused to determine to apply the one or more privacy policies to the structured data, respective ones of the one or more elements, or a combination thereof when initiating the exchange.

According to another embodiment, a computer-readable storage medium carries one or more sequences of one or more instructions which, when executed by one or more processors, cause, at least in part, an apparatus to receive a request for an exchange of structured data among a plurality of devices. The apparatus is also caused to determine one or more elements of the structured data. The apparatus is further caused to determine one or more privacy policies corresponding to the structured data, respective ones of the one or more elements, or a combination thereof. The apparatus is also caused to determine to apply the one or more privacy policies to the structured data, respective ones of the one or more elements, or a combination thereof when initiating the exchange.

According to another embodiment, an apparatus comprises means for receiving a request for an exchange of structured data among a plurality of devices. The apparatus also comprises means for determining one or more elements of the structured data. The apparatus further comprises means for determining one or more privacy policies corresponding to the structured data, respective ones of the one or more elements, or a combination thereof. The apparatus also comprises means for determining to apply the one or more privacy policies to the structured data, respective ones of the one or more elements, or a combination thereof when initiating the exchange.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for applying privacy policies to structured data are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term "structured data" refers to information that is described based on a data model, which is an abstract model describing how data is represented, accessed, or processed. Although various embodiments are described with respect to structured data, it is contemplated that the approach described herein may be used with other types of information, sometimes referred to as unstructured data.

As used herein, the term "privacy policy" refers to principles and rules set up by an information management system, or by the users of the system, in order to protect users' information against unauthorized access and to provide various levels of authorization (e.g., read-only, read/write, etc.) to the information. In one embodiment, a privacy policy may include or otherwise be associated with information such as information protection rules, information owners' identification key(s), information encryption key(s), etc.

Figure 1:
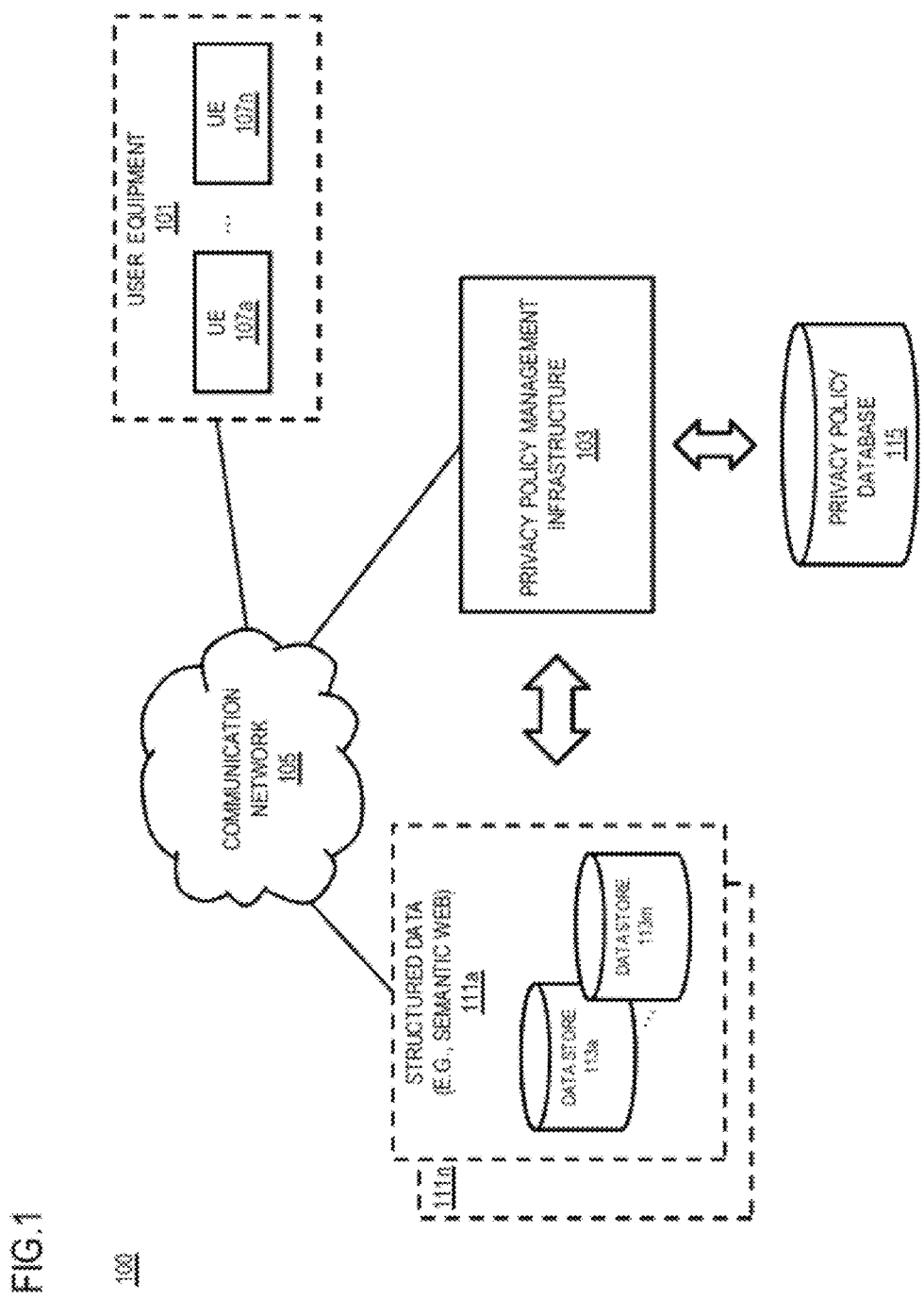
FIG. 1 is a diagram of a system capable of applying privacy policies to structured data, according to one embodiment.

FIG. 1 is a diagram of a system capable of applying privacy policies to structured data, according to one embodiment. The basic concept of privacy policy management provides approaches for addressing risks inherent in electronic communication. Policies define who can send information to or receive from whom and what information can be sent or received. Typically, privacy policies are developed as tools and applied on information through specific policy management servers. A typical policy management system is equipped with parameters that can be tailored and setup according to the type, configuration and rules associated with the information to which the policy applies. When a query on the information is received, the policy management system grants access right to information based on the policies that apply to the requested information. The policy management system may also setup privacy policies, update policies, increase or decrease privacy level or preserve the policies. However, distributed environments (e.g., smart spaces, semantic webs) can store the same and/or related information across heterogeneous components with potentially different access requirements, restrictions, policies, etc. For example, a query for contact information may apply to both a user's private contact list stored at a user device and a public contact list stored, for instance, within a social networking service. In this example, the private contact list and the public contact list operate under different access and/or privacy policies whereby the private contact list is accessible only by the information owner, while the public contact list is accessible by the information owner and the owner's social networking friends. Under conventional approaches, the same query typically cannot be applied to these two different data sets because of the differing access policies. As a result, current systems often provide incomplete results or may have conduct more than one query to obtain the results.

Furthermore, communication devices (e.g. mobile devices) are becoming one of the main tools for storing, sending, and receiving various kinds of information from favorite music to personal content. The volume and type of services provided to the users through various user equipments via communication networks are rapidly increasing. Using these services may require extensive exchange of data between user equipments, service providers, network components, distributed information sources (e.g., information clouds) etc. Furthermore, sender (e.g. network operator) and/or owner (e.g. a service provider, a user, etc.) of the data may wish to apply one or more privacy policies to the data, to a portion of data, to certain locations in the corresponding storage spaces, or a combination thereof, while the receiver may wish to apply its own privacy policies to the data, to portions of data, to certain locations in the corresponding storage spaces, or a combination thereof.

Additionally, with recent developments in technology, the capacity of the storage space available to a user on one or more devices and the number and variety of available applications are increasing. Specifically, introduction of more recent technologies, such as information spaces, enable devices to connect to and access information that is distributed over a wide range of locations and platforms with different standards, thereby makes the process of managing privacy of such information among multiple devices quite challenging.

On the other hand, the use of memory tags (such as radio frequency (RF) memory tags) is on the rise and many people use the memory tags for transferring data between devices, networks, etc. However, currently there is no filtering or privacy setting affecting the inbound or outbound data when written on or read from a memory tag. Therefore there is a need for privacy setting in different levels for different types of data transmission between active and passive devices such as phone to phone, phone to storage tag to phone, phone to privacy tag to phone, etc.

To address this problem, a system 100 of FIG. 1 introduces the capability to apply privacy policies to structured data prior to transmission of data from a device to another. In one embodiment, each device, each component of a device, or each storage location may be provided with its own privacy profile consisting privacy policies defined based on the user or service requirements, device configurations, etc. The privacy policies may be applied to inbound data (data received), outbound data (data sent), devices, endpoints, data storages, etc.

In one embodiment, the privacy policies or privacy levels applied to inbound data, outbound data, or stored data may be different. For example, inbound and outbound streams of data may each be treated based on its own privacy policies. The data may be less sensitive for the sender but more sensitive for the receiver which means that certain privacy levels need to be properly placed.

In another embodiment, the privacy policies for data may be set via Radio Frequency (RF) memory tags and embedded tags. Data privacy policies can be divided into various types such as visible, sharable, mergeable, and various levels such as high, low or medium privacy levels either for outbound or inbound data defined by the information management systems or by data owners, distributors or users. Alternatively, specific privacy policy rules may be assigned to certain locations in the storage, which creates a relationship between data elements in the storage space and any entities that have access to the storage.

The level of privacy assigned to data, limits the portion of the data (e.g., content, credentials, configurations, etc.) that can be shared or accessed. For example, the data written to a RF memory tag (high memory capacity near field communication tags or other wireless memory tags to facilitate delivery of services and access or transfer of related digital content such as media files, documents, applications, etc.) may have a different privacy setting than the data read out form the memory tag.

In various embodiments, privacy application mechanism for different cases of data transmission such as, user equipment (UE) to UE, UE to storage, storage to UE, RF memory tag to UE, UE to RF memory tag, etc. is provided.

It is noted that a memory tag may be equipped with various types of communication channels. For example, a memory tag may have one or more mutual/single wideband channels (short range) utilized for all communications such as data, privacy policies, tokens, etc. Alternatively, a memory tag may have one or more narrowband (long range) channels, for example, for privacy policies, tokens etc. and one or more wideband (short range) channels for larger volumes of data. Furthermore, a memory tag may be equipped with any combination of different communication channels so that, for example, one or more of the channels are battery powered (active tag) while one or more other channels are powered via wireless power transfer (passive tag).

In one embodiment, application of privacy policies to structured data can be provided to network users via information spaces, which allow interoperation among distributed information and processes from different sources. Information spaces, also referred to as smart spaces, provide very flexible multi-sourcing that accounts and relies on the observation that the same piece of information and/or related processes can come from different sources. For example, the same information and/or related processes (e.g., contact information for a particular contact) can appear in the same information space from multiple sources (e.g., a locally stored contacts database, a public directory, a work contact database, etc.). In one embodiment, information within the information space or smart space is represented using Semantic Web standards such as Resource Description Framework (RDF), RDF Schema (RDFS), OWL (Web Ontology Language), FOAF (Friend of a Friend ontology), rule sets in RuleML (Rule Markup Language), etc. Furthermore, as used herein, RDF refers to a family of World Wide Web Consortium (W3C) specifications originally designed as a metadata data model. It has come to be used as a general method for conceptual description or modeling of information that is implemented in web resources; using a variety of syntax formats. Although various embodiments are described with respect to information spaces and RDF, it is contemplated that the approach described herein may be used with other structures and conceptual description methods used to create models of information.

An information space may consist of, for instance, several distributed devices that communicate information (e.g., RDF graphs) via a shared memory such as a Semantic Information Broker (SIB). In one embodiment, a device within an information space environment may store information locally in its own memory space or publish information to the semantic information broker. In the first case, the device is responsible for any process needed for combination or extraction of information, while in the second case the data manipulation processes can be conducted by the semantic information broker. By way of example, the information stored within an information space may be organized as lists or sets of information that can include many data elements (e.g., a contact list, inventory of goods, business directory, etc.).

The basic concept of information space technology includes providing access to distributed information for various devices within the scope of the information space. In certain embodiments, this access is provided in such a way that the distributed nature of the information is hidden from users. As a result, the information space appears to a user as if all the accessed information is stored on the same device. The information space also enables a user to have control over information distribution by transferring information between devices that the user has access to based on various types and levels of privacy policies. For example, a user may want to transfer information among work devices, home devices, and portable devices, wherein the information on home device (i.e., personal information) has the highest level of privacy while a portable device that is used as a music player has the lowest privacy level. Alternatively, each element of personal data may have a different level of privacy. For example, home address or telephone number may be assigned a lower privacy level than social security number, date of birth, or a credit card number. Current technologies enable a user of a mobile device to manipulate contents such as data and information via the elements of one or more user interfaces of one or more user equipments. It is noted that the privacy level may be setup in a way that even though the data exists on a memory it is kept hidden from certain entities (users, devices, etc.). Alternatively, the data with a very high level of privacy may be removed from the memory so that no attempt to gain access to it may succeed.

In one embodiment, the mechanism of system 100 enables a user or a group of users to exchange distributed online information with different levels of privacy between multiple devices.

As shown in FIG. 1, the system 100 comprises a set 101 of user equipments (UEs) 107a-107n having connectivity to a privacy policy management infrastructure 103 via a communication network 105. By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UEs 107a-107n are any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, Personal Digital Assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 107a-107n can support any type of interface to the user (such as "wearable" circuitry, etc.). Furthermore one or more of the UEs 107a-107n can be a backend device (e.g., a server or node), a service provider, a content provider, or any device involved in the exchange of structured data.

In one embodiment, the owner of each UE 107a-107n owns the structured data that is distributed throughout the data stores 113a-113m within an environment of structured data, such as a semantic web 111a-111n. The data stores 113a-113m may be located on the UE 107a-107n or on a RF memory tag where the owner can have direct access to or may be accessible to the user via the communication network 105 and information spaces within the distributed environment 111a-111n. The information may be identified by the user as public, which makes it accessible to any other user having connectivity to the owner via the communication network, or may have been made private, where the owner can decide the level of accessibility by using policies enforced by the privacy policy management infrastructure 103. Furthermore, the user or the privacy policy management infrastructure may assign one or more privacy levels to one or more portions of the structured data or all the data. Some of the various factors that may affect a privacy level are owner preferences, sender preferences, receiver preferences, system (hardware, software) preferences, strategic preferences (management, server), etc. Each policy may include, for each element of information, data such as owner of the information, source of the information, keys associated with the information (e.g. access keys, encryption/decryption keys), etc.

In one embodiment, the privacy policy management infrastructure 103 generates one or more tokens and associates the tokens with the structured data, one or more elements of the structured data, or a combination thereof, wherein the tokens contain privacy rules applied to the data. The generated tokens may accompany the data that is being transferred between devices and the policies embedded in the tokens may include combined policies introduced by the data owner, the sender, the sending device, the receiver, the receiving device, or any other entities (devices, servers, etc.) that will pass the data until it reaches its final destination. At every step of data transfer, the transferring (or passing) entity may verify the tokens content before handling the data. For example one entity may have the right to read the data content, another entity may have the editing right, while a third entity can only store or transfer the data without being able to access its content.

In another embodiment, the privacy policy management infrastructure 103 may provide data filtering on the sender side, receiver side, or on both sides. The filtering process on the sender side may prevent sensitive data from being sent and allow only portions of the data identified as sharable by privacy policies to be sent. Furthermore, the filtering process on the receiver side may block portions of the data that may be harmful or the privacy settings of the receiver of the data disqualify the receiver for having access to the data.

In yet another embodiment, the privacy policy management infrastructure 103 may annotate portions or the whole data with metadata related to the privacy policies associated with the data. At any stage during the data transfer, the entities handling the data may refer to the annotations accompanying the data for policy rules applied to the data.

In one embodiment, a privacy policy may be represented by a data structure that contains data such as a set of rules applied by the policy, a set of operations that can be performed on the information and their application is controlled by the policy (e.g. read, write, get, find, modify, etc.), one or more keys for the policy (e.g. for policy validation), one or more hash for the policy (e.g. for decoding/encoding the keys), the owner of the policy, etc. In this embodiment, policy definitions are stored in policy database 115 and accessed by components of the privacy policy management infrastructure 103 for the verification of processes on the data stores 113a-113m. Additionally, the privacy policy management infrastructure may modify the policies based on the requests from data owners, distributors, providers, users, etc. The modification may include changing the policy laws, increasing or decreasing privacy levels, etc.

It is noted that due to the distributed nature of smart spaces, the information content of an information space may be physically scattered over multiple distant locations. Additionally, since every user or device may determine policies for manipulation of the information that they own, they receive, or they interface, the policy regulations that should be verified before any access to the information content is allowed, may as well be distributed. As a result, obtaining the policies associated with the information content will noticeably increase the time and resources spent on accessing the information. However, the tokens or annotations accompanying data as previously explained enable the policy information to be incorporated into the same data structures that carry the information content and therefore once the content is transferred the policy information will accompany the content and can be verified with minimal use of excessive resources.

By way of example, the UE set 101 and the privacy policy management infrastructure 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
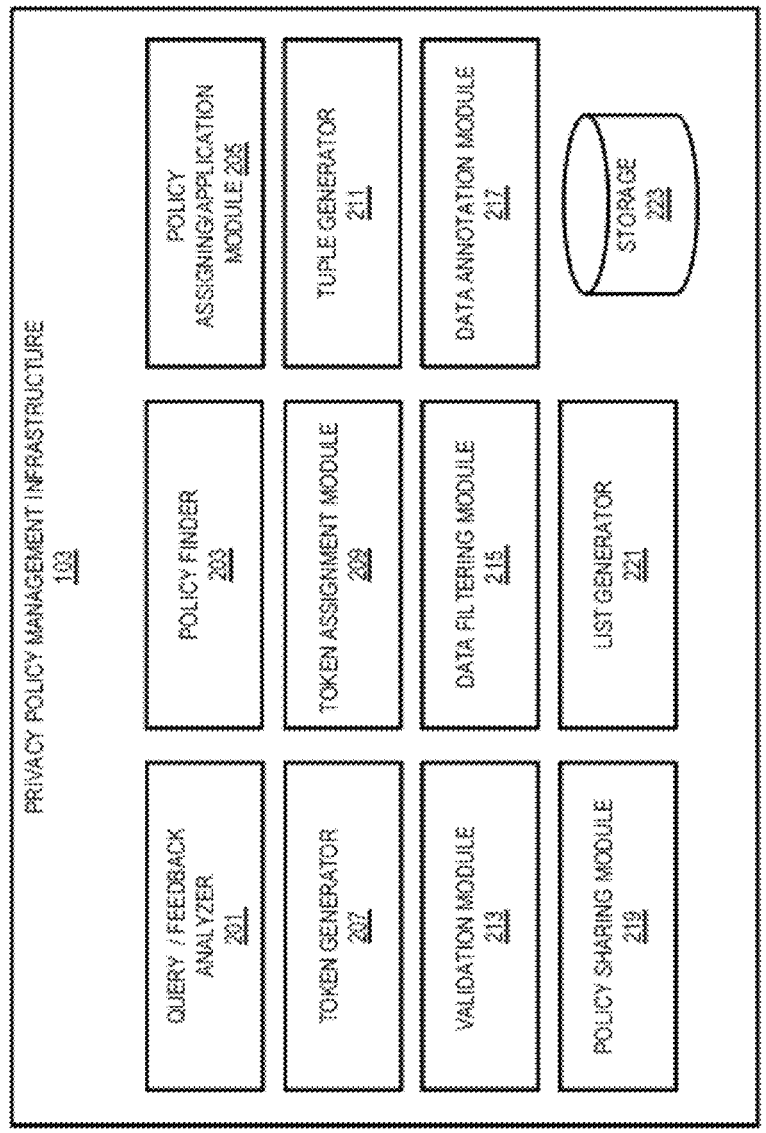
FIG. 2 is a diagram of the components of privacy policy management infrastructure, according to one embodiment.

FIG. 2 is a diagram of the components of privacy policy management infrastructure, according to one embodiment. By way of example, the privacy policy management infrastructure 103 includes one or more components for providing application of privacy policies to structured data. It is contemplated that the functions of these components may be combined in one or more components or performed by other components of equivalent functionality. In this embodiment, the privacy policy management infrastructure includes a query/feedback analyzer 201, a policy finder 203, a policy assigning/application module 205, a token generator 207, a token assignment module 209, a tuple generator 211, a validation module 213, a data filtering module 215, a data annotation module 217, a policy sharing module 219, a list generator 221, and a storage 223.

In one embodiment, the privacy policy management infrastructure 103 receives a request for an exchange of structured data among a plurality of devices. The query/feedback analyzer 201 analyzes the request for determining one or more elements of the structured data that the exchange has been requested for. The policy finder 203 checks the privacy policy database 115 or storage 223 for privacy policies $P_1$, $P_2 \ldots P_m$ concerning the one or more determined elements of structured data $D_1, D_2 \ldots D_n$. There can be a many to many relationship between set D of data element and set P of privacy policies $$(D \stackrel{m:m}{\leftrightarrow} P)$$

meaning that each policy $P_i$ may apply to one or more data elements $D_j$ while each data element $D_j$ may have one or more policies $P_i$ applied to it. If neither the privacy policy database 115 nor the storage 223 contain any policies concerning some or all the data elements, the absence of policies may be interpreted as an indication that the data elements are public and there is no restriction on accessing them by any user, device, etc. The storage 223 may be used as cache wherein the policy information extracted from the privacy policy database 115 is temporarily stored (for example for a certain period of time) and any reference to those extracted policies during the certain period of time can be made via storage 223 without a need for accessing the privacy policy database 115, given that the content of the privacy policy database 115 has not been modified since the last access or in other words the content of storage 223 is current and up to date. Following the extraction of policies related to the data elements from the privacy policy database 115, the policy finder 203 may insert or update the content of the storage 223 accordingly. The policy finder 203 may also signal the validation module 213 indicating that the newly updated policies may need to be validated. Since each data element $D_j$ may have a set of privacy policies $P_1$, $P_2 \ldots P_m$ assigned to it, some of the privacy policies $P_i$ may be conflicting with each other. The validation module 213 verifies the policies and applies updates on policies for resolving the conflicts. Following the validation of policies the policy assigning/application module 205 assigns the verified policies to the data elements. The policy assigning/application module 205 may use various mechanisms for binding policies to the data.

In one embodiment, the privacy policies are assigned to the data by generating tokens and assigning them to the data. In one embodiment one or more tokens corresponding to the verified privacy policies may be generated by the token generator 207. Once a token is generated, the token assignment module 209 creates links between the token which contains policy information and the data elements that the policy information applies to.

The policy tokens may be generated using different formats and/or data structures. In one embodiment, a token can be generated based on a tuple mechanism wherein each token can be represented by one or more tuples. A privacy tuple may consist of several attributes such as a subject s, a predicate p, an object o, a source of record sor, capabilities of policies cap, a policy identifier (ID), etc. A tuple [s, p, o, sor, cap, ID] may hold information regarding a policy identified as ID, with capabilities cap, applied to a data element s, before the operation p (e.g. share, make visible, send to, etc.) is applied on s where the operation p involves an object o (the entity receiving the shared s, seeing the visible s, receiving the sent s, etc.). The tuple containing the privacy policy token may be generated by the tuple generator 211 and assigned to the data elements by the policy assigning/application module 205.

In another embodiment, the data elements may be filtered according to the related privacy policies. The filtering process is performed by the data filtering module 215 and may prevent one or more data elements from being transmitted. For example, a data element such as a credit card number may be identified as sensitive by the related policies. In this case the filtering process may exclude the sensitive data elements from transmission, from being shared with other entities (devices, users, etc.), or from any other manipulations that may contradict with the related policies.

In yet another embodiment, the data elements may be annotated according to the related privacy policies. The annotation process is performed by the data annotation module 217. The annotation process may mark data elements as sensitive, anonymous, allowed, encrypted, etc. prior to transmission of the data. The owner or sender of the data may mark the data indicating how the data should be handled based on the privacy policies. Similarly, the receiver of the data may mark the data indicating how to treat the received data.

In other embodiments, the privacy policies are applied not only to the data elements, but also to the entities involved in data transmission or manipulation such as users, devices, etc. For example, some privacy policies may be associated with a list of participating devices. In these embodiments the list generator 221 receives information about devices and policies that are associated with those devices from the policy assigning/application module 205 and creates lists where each list indicates devices and the policies associated to all the devices in the list. The list generator 221 may store the lists in the storage 223 or in the privacy policy database 115. The policy assigning/application module 205 refers to the lists prior to any data exchange among devices. Additionally, the entities may share privacy policies with each other. For example, two devices may share privacy policies related to certain data elements so that the data elements are accessible only by the two devices while other devices not sharing the policy cannot access the data or even if they can access the data, cannot understand it. The process of policy sharing between devices is performed by the policy sharing module 219. The request for policy sharing may be made by each of the policy owner or policy receiver. However, the sharing may not take place unless both parties agree and accept the terms and conditions of the policies and of the sharing. Once policy sharing is approved and applied by the policy assigning/application module 205, the list generator 221 may modify the lists accordingly.

Figure 3:
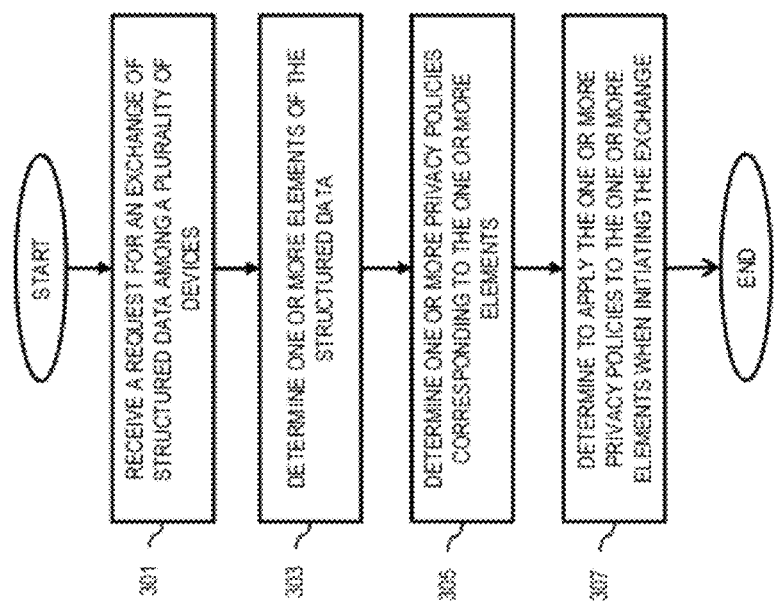
FIG. 3 is a flowchart of a process for applying privacy policies to structured data, according to one embodiment.
Figure 16:
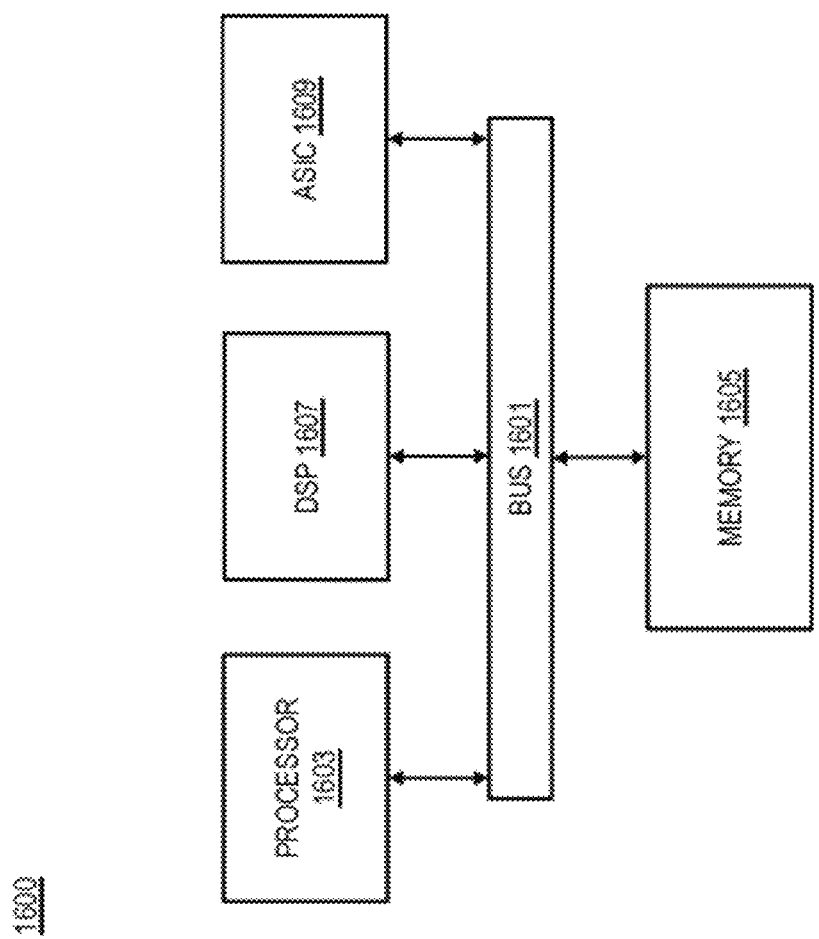
FIG. 16 is a diagram of a chip set that can be used to implement an embodiment of the invention.

FIG. 3 is a flowchart of a process for applying privacy policies to structured data, according to one embodiment. In one embodiment, the privacy policy management infrastructure 103 performs the process 300 and is implemented in, for instance, a chip set including a processor and a memory as shown in FIG. 16. In step 301, the privacy policy management infrastructure 103 receives a request for an exchange of structured data among a plurality of devices. The request may be sent from a sender, from a receiver, or from a third party arranging an exchange. Furthermore, any of the plurality of devices may be a user equipment 107*a*-107*n*, a backend device communicating with the UEs 101 and the privacy policy management infrastructure 103 via the communication network 105, an active or a passive memory tag (e.g. RF memory tag) associated with one or more UEs 101, or a combination thereof. The exchange request may be sent as a query, for example in a standard query language format. In step 303, the query/feedback analyzer 201 determines one or more elements of the structured data that are going to be exchanged. The data elements may be identified by a specific identifier or a combination of characteristics such as owner, field name, value, etc. and a combination thereof. In step 305 the policy finder 203 checks the privacy policy database 115 or the storage 223 for any rules associated with the data elements determined by the query/feedback analyzer 201. The policy finder 203 may provide a list of policies associated with each of the data elements determined by the query/feedback analyzer 201. In step 307 the privacy policy management infrastructure 103 determines to apply the list of privacy policies associated with each data element to the data element. In various embodiments, different mechanisms for application of privacy policies to the data elements are used. The privacy policy application mechanisms are discussed in further detail in next FIGs.

Figure 4:
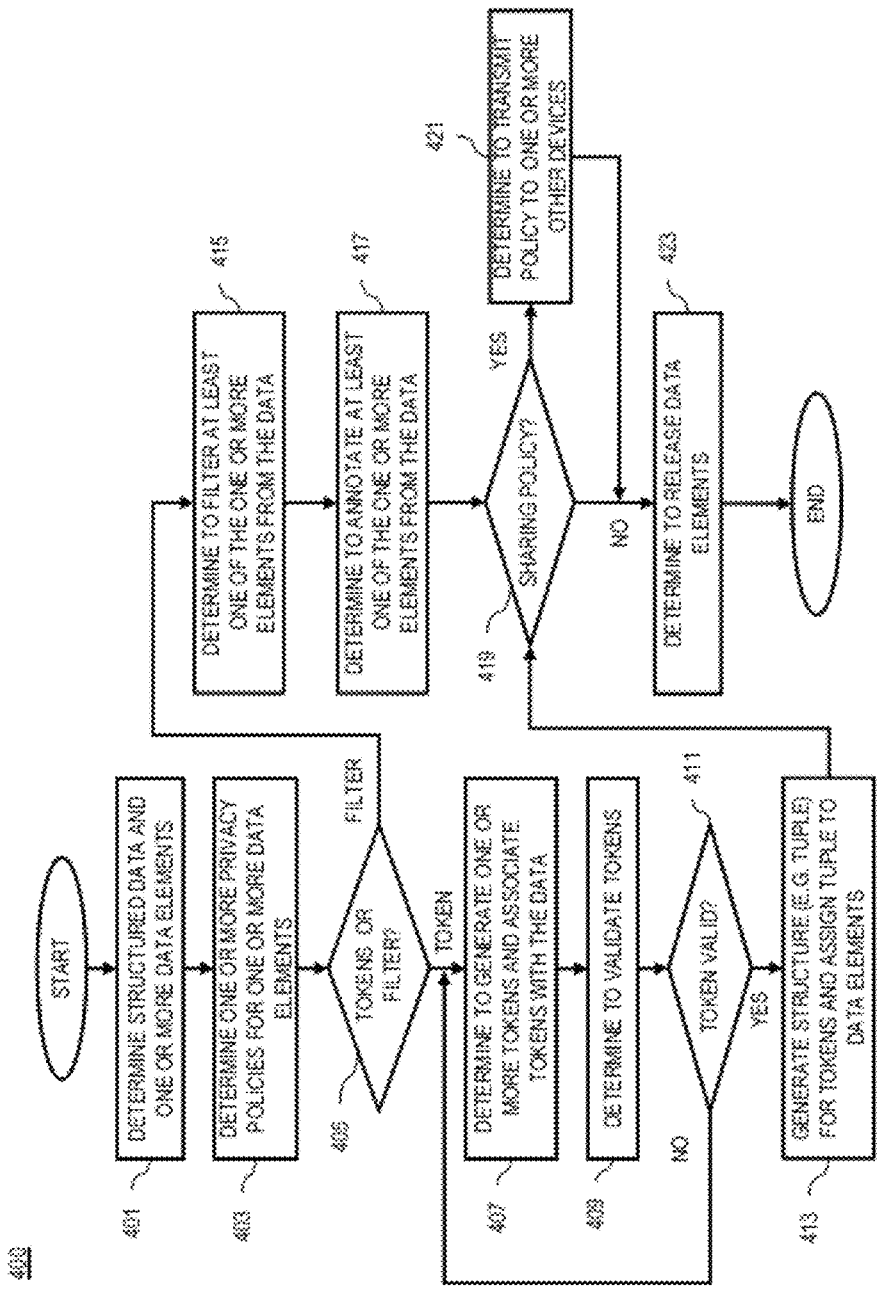
FIG. 4 is a flowchart of a process for determining a mechanism of applying privacy policies to structured data, according to one embodiment.

FIG. 4 is a flowchart of a process for determining a mechanism of applying privacy policies to structured data, according to one embodiment. In one embodiment, the privacy policy management infrastructure 103 performs the process 400 and is implemented in, for instance, a chip set including a processor and a memory as shown in FIG. 16. In step 401, as seen in FIG. 3, the query/feedback analyzer 201 determines one or more data elements that are going to be transmitted or shared. Per step 403 the policy finder 203 determines one or more privacy policies corresponding to the one or more elements. Per step 405 the policy assigning/application module 205 determines a mechanism for assigning the policies to the data elements. The determination of the mechanism may be based on various factors such as policy characteristics and configurations, data type and configurations, including the data structure, type of operation that will be performed on the data such as transmitting, sharing, allowing to be read, allowing to be modified, etc.

In one embodiment, for example, a device (sender) may send one or more data elements to one or more devices (receivers), wherein each of the receivers may have the right of accessing a certain part of the data elements or each receiver device may have its own defined restrictions on the data that it may or may not receive. For a receiver device to access only a certain portion of the data and not all of it, the policy assigning/application module 205 may use one or more filtering mechanisms to filter out the inaccessible portion of the data and send only the accessible portion to each one of the receiver devices.

In some other embodiments, the device one may want to send one or more data elements to the second device, while the data needs to pass through other devices, for example a third device, wherein the third device acts as an interface for pass the data elements on to the second device without having any access rights to the data content. In such embodiments, the policy assigning/application module 205 may use a token mechanism to attach the privacy policy information to the data in form of one or more tokens so that at any step during data transmission the access rights to the data elements can be extracted from the tokens accompanying the data elements. In yet other embodiments, the privacy policy information may accompany the data in forms other than tokens. For example, the data elements may be annotated based on the privacy rules applied to them. Referring back to FIG. 4, in step 405 the policy assigning/application module 205 determines whether assigning the determined policies to the determined data elements should be performed by utilizing tokens or by filtering data.

In one embodiment, if tokens are going to be used per step 407 the token generator 207 generates tokens based on the determined policies. As explained in FIG. 2, a token may include information about the data, the policies, and the connection between data and policies. Per steps 409 and 411 the validation module 213 verifies the validity of the generated tokens and resolves the inconsistencies that may exist between tokens. For example the policies determined for a certain data element may be contradictory to each other. If the tokens are not valid, the process may repeat from step 407 where the token generator 207 can regenerate the tokens considering the invalidities discovered by the validation module 213. For example, the token generator 207 may calculate the logical combination of the policies and generate new tokens based on the combination. Following the approval of tokens validity, per step 413 the tuple generator 211 generates the data structure that carries the validated tokens.

Each token may be given a tuple structure such as [s, p, o, sor, cap, ID] wherein ID is a policy identifier, with capabilities cap, applied to a data element s, before the operation p (e.g. share, make visible, send to, etc.) is applied on s where the operation p involves an object o (the entity receiving the shared s, seeing the visible s, receiving the sent s, etc.). The tuples containing the privacy policy tokens generated by the tuple generator 211 are assigned to the data elements by the policy assigning/application module 205 per step 413.

In another embodiment, if filtering is the mechanism used by the policy assigning/application module 205, per step 415 the data filtering module 215 applies one or more filters identified by the policies on the data. The filters may mask, encrypt, or remove one or more data elements, or perform any combinations thereof. Per step 417 the data elements are annotated based on the policy and the filtering process by the data annotation module 217. The outcome of either step 413 or 417 is data elements refined by the privacy policies and ready to be manipulated (shared, sent, made visible, etc.). Per step 419 the policy sharing module 219 checks whether the applied policies are to be shared with other devices. For example, if the data elements are being shared among a plurality of devices, the applied privacy policies include any restrictions on both the sender and the receiver devices. In this case the policies can be shared among the plurality of devices involved in the data sharing per step 421, so that the receiver devices do not have to repeat steps such as validation, mechanism attachment, etc. Finally, per step 423 the data elements accompanied by privacy policies applied to them by the policy assigning/application module 205 can be approved for release, by the privacy policy management infrastructure 103.

In some embodiments, where the policies are to be shared with one or more other devices the list generator 221 generates and maintains the list of devices with whom the policies are being shared. The list may be stored in storage 223 by the list generator. The policy sharing module 219 may refer to the list and share the policies with the devices on the list while performing step 421.

In one embodiment, the process described in FIG. 4 can be performed on one or more memory locations in a way similar to the data elements. This means that the privacy policy management infrastructure 103 can apply privacy rules to memory locations to protect those locations regardless of the content of the memory location.

In various embodiments, the privacy policies as described can be applied to the data or memory locations at a protocol stack layer (e.g., software implementation layer), a physical layer (the lowest layer of a network including the basic transmission technologies of the network) or a combination thereof.

Figure 5:
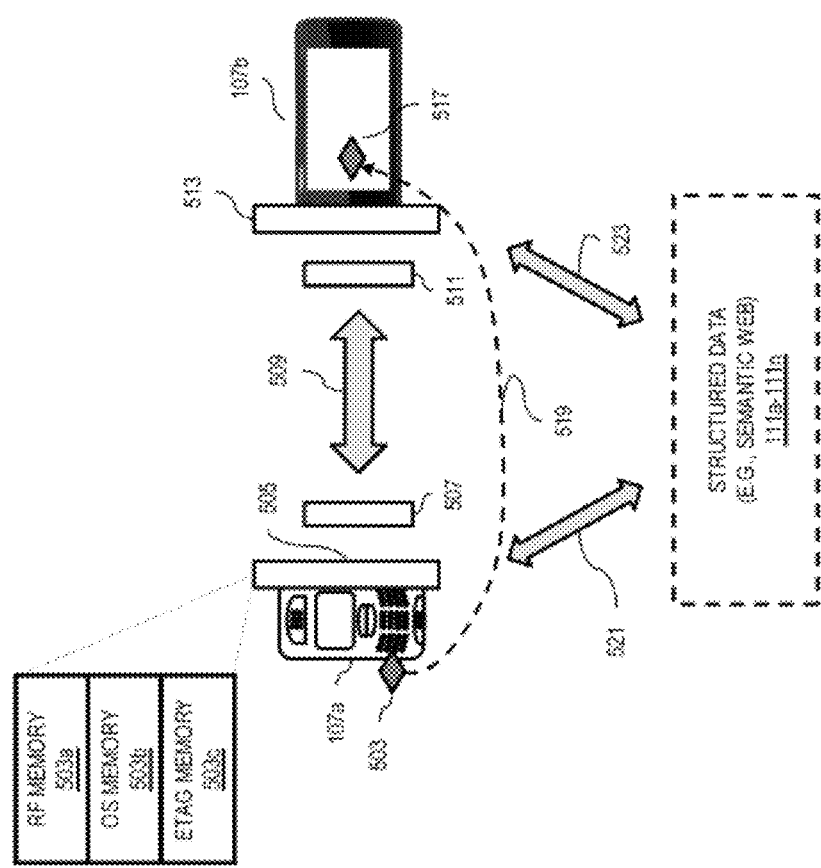
FIG. 5 is a diagram of privacy principles based on filtering mechanism, according to one embodiment.

FIG. 5 is a diagram of privacy principles based on filtering mechanism, according to one embodiment. In one embodiment, structured data is being exchanged between a first UE 107*a* and a second UE 107*b*. The devices may be equipped with active memory tags such as 503 and 517. The UEs 107*a* and 107*b* may additionally have other types of memory tags, or memory areas within the same tag, shown as memory stack 505 which may include RF memory 503*a*, OS memory 503*b*, E-tag memory 503*c*, etc.

In various embodiments, privacy policies can be applied on coarse grained or fine grained data. For example, the coarse grained policy may be applied on the memory stack 505 or on any of the memory tags 503*a*, 503*b* or 503*c*, while fine grained policies may be applied on each component of structured data.

Furthermore, the devices may have access to the distributed sources of structured data 111*a*-111*n*. The exchange of the structured data between UEs 107*a* and 107*b* is represented as arrow 509, and components 507 and 511 represent filters that filter the data on both sides before being sent and before being received. Various types of exchange may be associated with structured data such as for example, "reading allowed", "reading disallowed", "writing allowed", "writing disallowed", "marked sensitive—transmission disallowed", "marked-sensitive—only encrypted transmission allowed", "partial transmission allowed—according to privacy policies" "reception allowed", "reception disallowed", "only certain format reception allowed", "partial reception allowed—according to privacy policies", etc.

Additionally, other types of privacy policies may be considered such as memory privacy, before data read from/written to the memory. The data with this type of privacy policy is read to the outbound filter before being transmitted. At the reception point the memory privacy may also include display privacy. A display privacy policy for the inbound data traffic may apply an additional level to the privacy to determine whether the received data can be displayed, partly displayed or not displayed.

Tables 1a and 1b show an example of partial allowance for exchange of a data record consisting of data fields name, ID, phone number, work number, and address. In this example the fields ID and address are considered as sensitive while other fields are sharable. Table 1b is the filtered version of Table 1a wherein the sensitive fields have been filtered out.

TABLE 1a

| Name | ID | Phone No. | Work No. | Address |
| --- | --- | --- | --- | --- |
|  |  |  |  |  |

TABLE 1b

| Name | XX | Phone No. | Work No. | XXXX |
| --- | --- | --- | --- | --- |
|  |  |  |  |  |

TABLE 1c

| Name | XX | Phone No. | YYYY | XXXX |
| --- | --- | --- | --- | --- |

It is noted that there is a hidden track of information sharing involved in the application of privacy policies. This information sharing is determined and protected on both the sender and received sides. The process of information sharing may be built in the endpoints or managed by the privacy policy management infrastructure 103.

Referring back to FIG. 5, in one embodiment the RF tag 503*a* of UE 107*a* may initiate a need to exchange, share, read, or write, outbound data with UE 107*b*, to the privacy policy management infrastructure 103. If the requested data does not exist in memory 505, the UE 107*a* sends a request for data to the structured data storage 111*a*-111*n*. The UE 107*a* may provide access to the structured data 111*a*-111*n* to the privacy policy management infrastructure 103. The request is received and analyzed by the query/feedback analyzer 201 of the privacy policy management infrastructure 103. In this specific example, the filtering mechanism is applied on the data of table 1a by component 507 which corresponds with the data filtering module 215. Table 1a is entered to filter 507 and table 1b is produced as a result while the filtering process is provided by data filtering module 215. In this case the process requires that fields ID and address being blocked from the exchange. The filtered table 1b may be transmitted to UE 107*b* via the physical layer or the protocol stack layer (e.g. MAC, PHY) shown by arrow 509.

Subsequently, UE 107a sends a connection establishment request and the exchange request to UE 107b and awaits response. Upon receipt of the request at UE 107b, the query/feedback analyzer 201 of the privacy policy management infrastructure 103 analyzes the request in order to see whether privacy policies of either of the UEs 107a or 107b prevent data exchange between the devices. If the data exchange is allowed based on the privacy policies of both parties, the query/feedback analyzer 201 analyzes the data of table 1b based on the data privacy policies associated with UE 107b. The filtered table 1b will then be entered to filter 511 associated with the data filtering module 215 that applies the privacy policies of UE 107b on the data prior to receiving the data at UE 107b. For example, privacy policies of UE 107b may require that some of the data fields or a whole data item be masked as "not for my eyes". some examples for this embodiment can be parental control privacy policies applied to mobile devices used by minors, application of ethical privacy rules on data, etc.

The filtered table 1c is the output of filter 511 wherein the data of the field "work number" has been masked based on privacy policies of UE 107b. The table 1c can then be provided to UE 107b by being stored on the memory 513. The data may also be stored in the structured data 111a-111n associated with UE 107b. The UE 107b may additionally inform UE 107a that the exchanged data was successfully received and stored with the proper privacy settings.

As previously explained, that the embodiments as discussed provide privacy in various levels of data granularity. With three memory areas RF memory 503a (e.g. external memory—low level of trust), OS memory 503b (e.g., server, operating system, etc.), and Etag 503c (e.g. internal memory—high level of trust), coarse grained privacy can be provided. The capacity of RF memory can be modified based on the storage needs of the device. On the other hand, enforcement of privacy policy on data elements by the privacy policy management infrastructure 103 provides fine grained privacy as well. The fine grained privacy policies can be extracted from data access records from the data provider, data access ontology filtering and arbitrating the visibility set for each structured data (e.g., visible clear, anonymous information clear, sensitive clear, sensitive not shown, or any other reason why privacy policy is needed and the data should not be visible).

In one embodiment, the filters 507 or 511 may be applied not only to the data but to the senders or receivers of the data. For example, the user of UE 107a may want to exchange the data with a group of receiving devices while exclude certain devices from sending the data to. Similarly, the receiving UE 107b may exclude certain devices to avoid receiving data from. Furthermore, for different devices in one group (e.g., family members) there can be different privacy levels. In other embodiments, user of a UE 107a-107n can either set the privacy levels of the structured data as an initial setup or instantly modify the settings in real time.

Figure 6A:
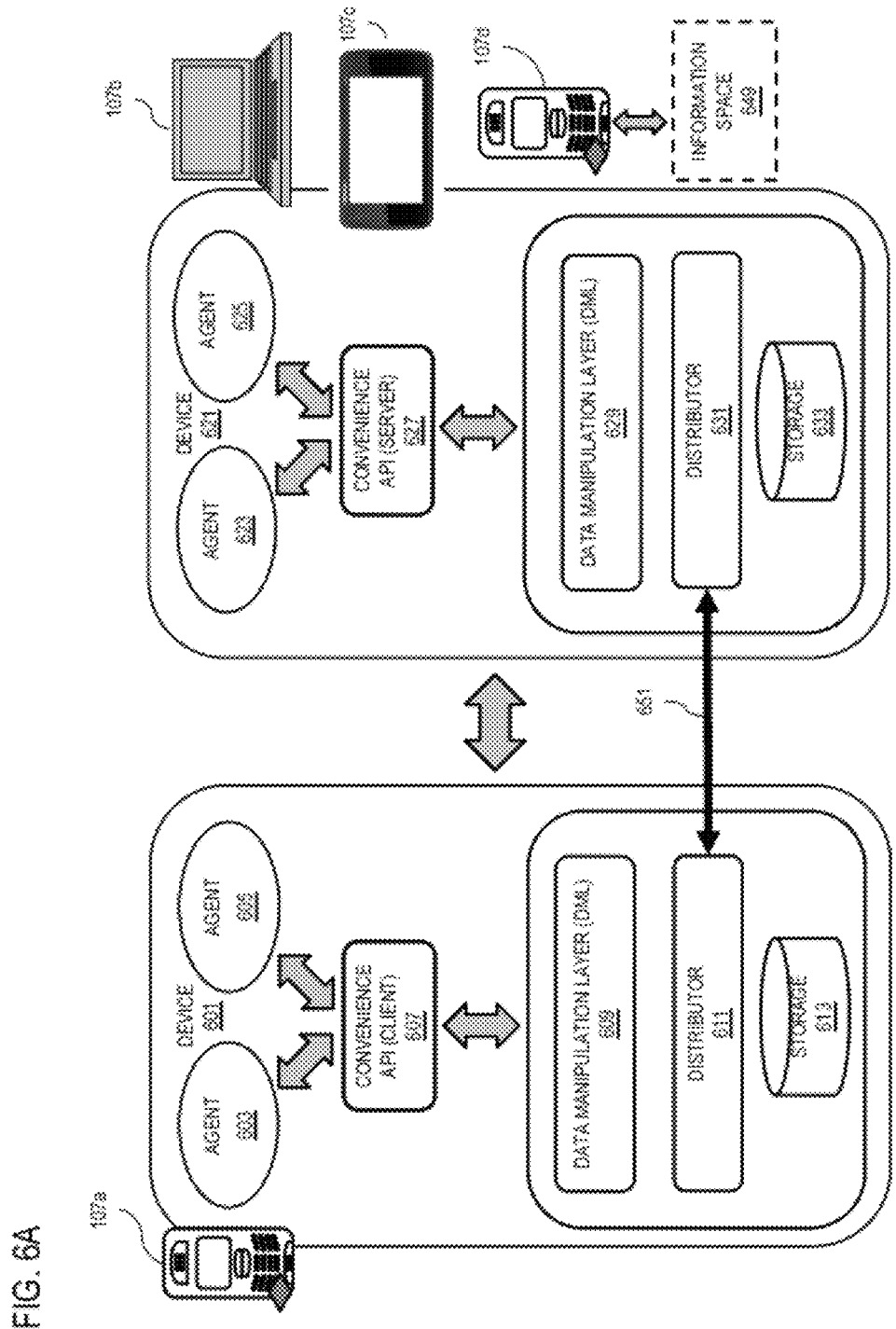
FIGS. 6A and 6B are diagrams of the internal structure of the devices involved in the exchange of structured data, according to one embodiment.
Figure 6B:
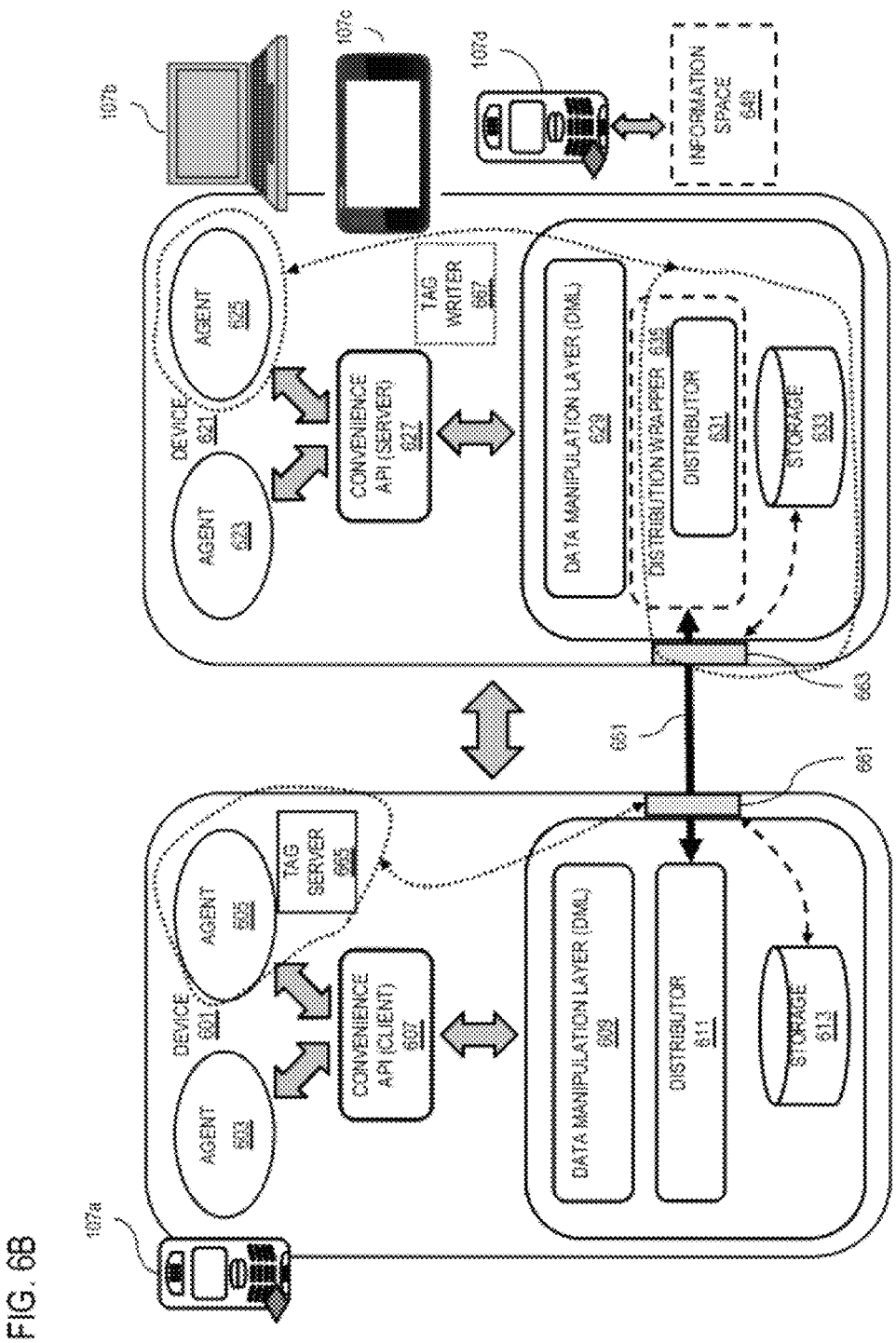

FIGS. 6A and 6B are diagrams of the internal structure of the devices involved in the exchange of structured data, according to one embodiment. FIG. 6A shows general privacy framework between devices 601 and 621. Each of the devices 601 or 621 may be a user equipment (UE) 107a-107n, which may be a user device, a backend device, a memory tag or any other device type. A device may include one or more agents such as agents 603 and 605 in device 601 and agents 623 and 625 in device 621. The agents within a device may act as interfaces between the device and other devices. Furthermore, the data manipulation layers 609 and 629 control the manipulation (insert, delete, update, etc.) of the data associated with the device. The data may be locally stored in storage 613 or 633 or distributed in one or more information spaces 649 accessible by the device. Distributors 611 and 631 handle data exchange between devices 601 and 621 shown by arrow 651. In the exemplary representation of FIG. 6A, device 601 is a UE 107a while device 621 may be any of UEs 107b, 107c or 107d wherein UE 107d is equipped with a memory tag and is associated with a distributed information space 649.

FIG. 6B shows the privacy framework for data exchange between devices according to one embodiment. In one embodiment, a device may be a UE 107a-107n, which may be a user device, a backend device (e.g. server), a memory tag (e.g. RF memory tag) or a combination thereof. Therefore, the exchange of structured data may be between any two UEs such as phone to phone, phone to backend, backend to phone, tag to phone, phone to tag, tag to backend, backend to tag, etc. FIG. 6b depicts data exchange between a phone 601 and a backend device 621.

In one embodiment, the distributor 611 may initiate a request for exchange of structured data with device 621. The request may be in the form of a query, a signal, a message or any combination thereof. The request is received and processed at the privacy policy management infrastructure 103 as previously discussed in FIGS. 2, 3, and 4. The block 661 represents a final arbiter for outbound data privacy prior to any data from device 601 is exchanged with any device 621. Additionally, in cases where data exchange is originated from device 621, component 661 acts as the initial arbiter that receives the inbound data at device 601. Similarly arbiter 663 works as initial and final arbiter for device 621.

In one embodiment, following the selection of a privacy policy application mechanism (token, filter, etc.) by the privacy policy management infrastructure 103, the data manipulation layer 609 applies the mechanism on the data elements that are going to be exchanged, which may be stored in storage 613. Subsequently, the data is sent to device 621 by distributor 611 via final arbiter 661. If the structured data resides on a memory tag attached to device 601, the tag server 665 communicates with the memory tag via one of the agents of device 601 (e.g. agent 605) to extract the data prior to the application of privacy policies to the data.

Subsequently, the exchanged data is received at device 621 by initial arbiter 663. The initial arbiter may verify whether the received data meets basic privacy policies of device 621 and refuse receiving the data if it does not meet the policies. The verification procedure is performed in communication with the privacy policy management infrastructure 103. If the data is approved, the initial arbiter 663 passes the data on to distributor 631 wherein the distributor 631 facilitates further process of the data. The distributor 631 may be provided with a wrapper 635 to facilitate data distribution and provide additional functionality for the distributor 631. The data may be stored on a memory tag via tag writer 667 and agent 625, stored on storage 633, processed by the data manipulation layer 629, etc. Additionally, the data may be stored on an information space 649 associated with device 621. For writing the data on device 621, the tag writer 667 may communicate with agent 625, the security endpoint (filter) 663, storage 633, and, at least partly, with the distributor 631 and distribution wrapper 635 (shown with dotted shapes and arrows on device 621).

Figure 7:
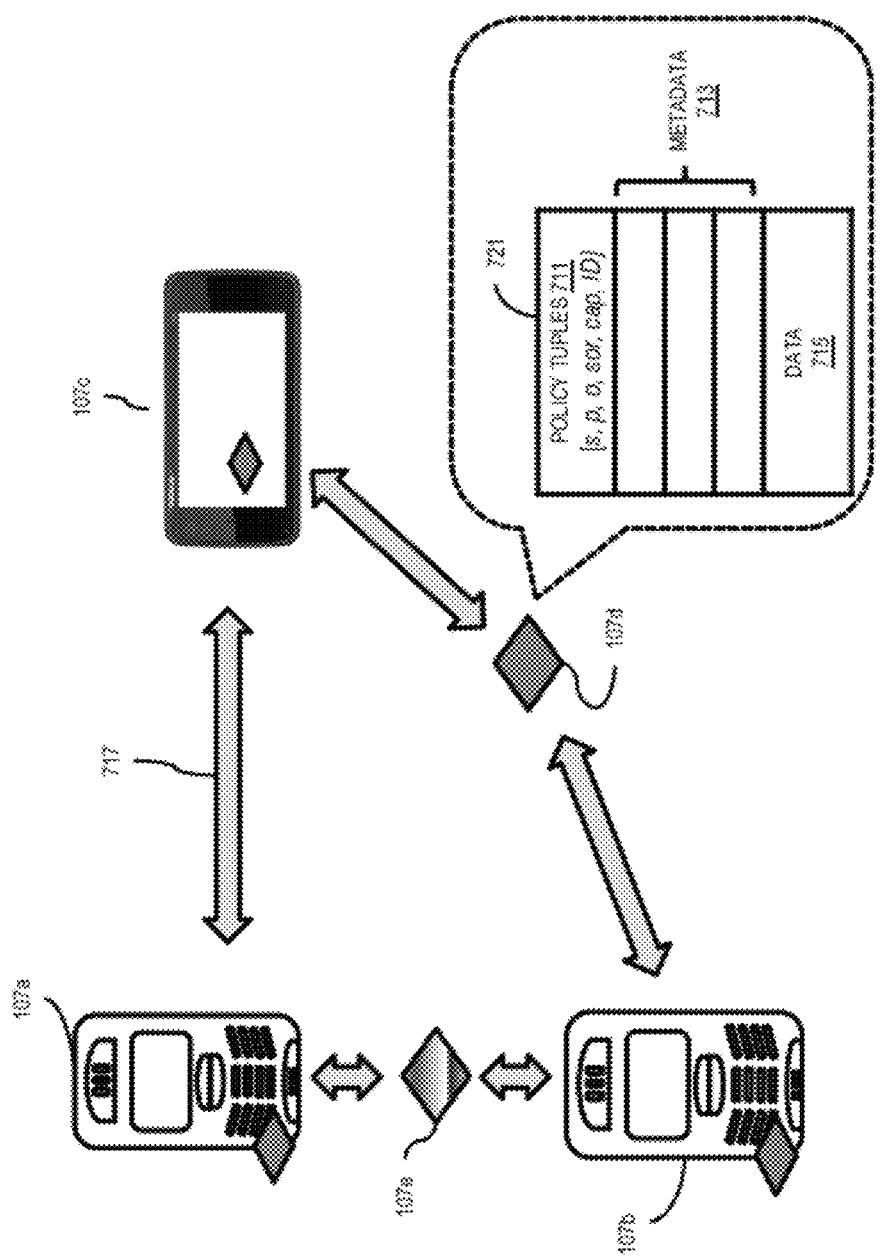
FIG. 7 is a diagram of privacy principles based on token mechanism, according to one embodiment.

FIG. 7 is a diagram of privacy principles based on token mechanism, according to one embodiment. In various embodiments, exchange of structured data can be performed directly from a UE to another UE, from a UE to another UE via a memory tag UE with no privacy policies associated to it, or from a UE to another UE via a memory tag UE with privacy policies associated to it.

In one embodiment, UEs 107*a* and 107*c* are directly exchanging structured data wherein each UE has its own privacy policies. For example, UE 107*a* may have a privacy policy set A and UE 107*c* have a privacy policy set B. The two sets A and B of privacy policies may overlap with each other, meaning that they may have common policies that they share with each other. Alternatively, the policy sets A and B may have no intersection parts and be two completely separate sets. In this embodiment, the policy finder 203 of the privacy policy management infrastructure 103 extracts the sets A and B from the privacy policy database 115 or from the local storage 223. The validation module 213 verifies policy sets A and B and finds the overlapping parts of policies that allow exchange between UEs 107*a* and 107*c*. In this embodiment, each policy is applied using token mechanism and may be in tuple form [s, p, o, sor, cap, ID] wherein s is a subject, p a predicate, o an object, sor a source of record, cap capabilities of policies, and ID the policy identifier. The validation module 213 may verify tuple contents and generate levels of visibility (sharability) for each data element. The visibility (sharability) levels may also be conditional, for example: "If condition i holds then make data visible, else make data invisible".

In another embodiment structured data may be exchanged between devices 107*a* and 107*b* wherein both devices share the same privacy policy set A and the exchange is performed via a memory tag 107*e* which is a storage-only tag and does not have any capability for storing privacy policies. In this case, since both UEs share the set A of privacy policies, the data elements can be exchanged between UEs 107*a* and 107*b* via tag 107*e* without a need for the privacy policies to be sent.

In yet another embodiment, the UEs 107*b* and 107*c* are exchanging structured data wherein each UE has its own privacy policies. Here UE 107*b* has a privacy policy set A and UE 107*c* has a privacy policy set B. This exchange is being performed via a memory tag 107*d* with the capability of storing data with attached privacy tuples. Table 721 in FIG. 7 represents an exemplary internal structure for tag 107*d*. As seen in table 721, the tag include three main portions, policy tuples 711, which include privacy policies associated with the data, metadata 713 which includes data regarding the configuration of the tag memory, and data 715 which is the actual data that is transmitted between UE 107*b* and UE 107*c*. In this embodiment, the validation module 213, verifies policy sets A and B and finds the overlapping parts of policies that allow exchange between UEs 107*a* and 107*c*. In this embodiment, each policy is applied using token mechanism and may be in tuple form [s, p, o, sor, cap, ID]. The validation module 213 may verify tuple contents and generate levels of visibility (sharability) for each data element. The visibility (sharability) levels may also be conditional. Following the validation, privacy tokens are generated by the token generator 207. The tuple generator 211 generates privacy tuples based on the tokens and the policy assigning/application module 205 associates the tuples to the data elements. The data elements are now ready to be transmitted from UE 107*b* to memory tag 107*d* which has the capability of storing privacy tuples as well as the data and can be accessed by the UE 107*c* according to the privacy policies imposed by privacy tuples.

Figure 8:
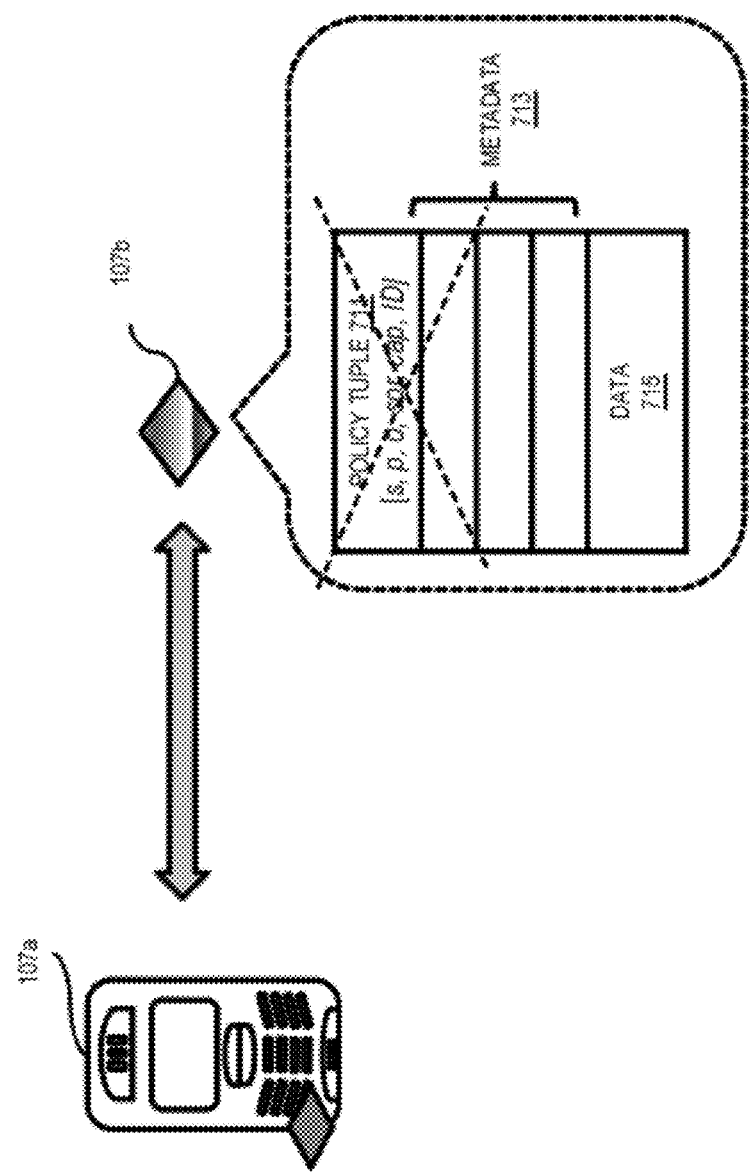
FIG. 8 is a diagram of privacy principles for memory tags, according to one embodiment.

FIG. 8 is a diagram of privacy principles for memory tags, according to one embodiment. In one embodiment, an external memory tag 107*b* associated with UE 107*a* may not have any privacy rules associated to it. As a result, the data content of memory tag 107*b* will not be validated against any policies. In other words, tag 107*b* may contain raw data with policy free visibility. Some other examples of the tags without policy are PHY tag, MAC SW tag, etc. In another embodiment, a memory tag may be a public tag wherein the content of the tag is accessible by everybody. In this embodiment the privacy tuples associated with the memory tag 107*b* may indicate that the tag is public. In yet another embodiment, the memory tag 107*b* may have one or more active privacy policy tuples and one or more passive tuples associated with it. The active tuples may include policy rules applied to the memory tag 107*b* while the passive tuples may include inactive privacy rules that can be activated based on certain conditions. In order to protect the security of the data stored to this type of tags, the data should be encrypted based on a content security key via UE 107*a*. Encryption of raw data makes its content meaningless for entities without access to the decryption key and content gets meaningful only when relationship with a privacy policy is set and the key is obtained.

In one embodiment, privacy resources are applied to tag 107*b* via the tag server. In this embodiment the tag server would consist of a remote server for privacy processing.

Figure 9:
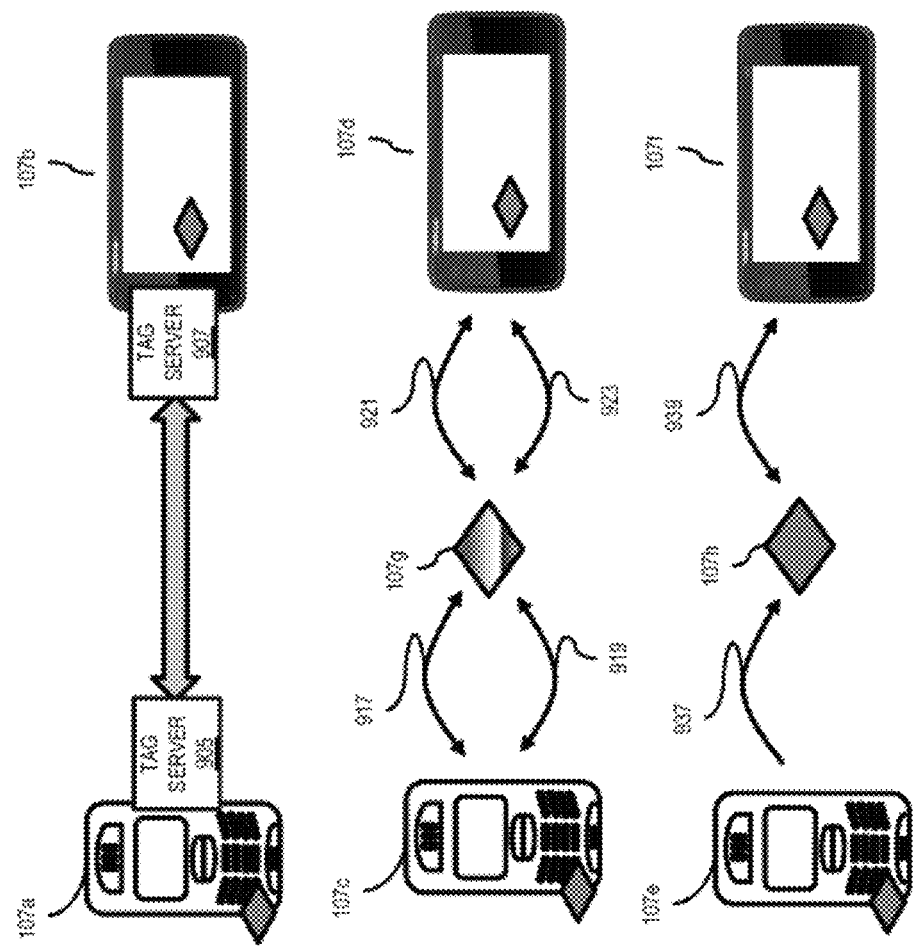
FIGS. 9A-9C are diagrams of temporary privacy mechanisms for exchange between different devices, according to one embodiment.

FIGS. 9A-9C are diagrams of temporary privacy mechanisms for exchange between different devices, according to one embodiment. FIG. 9A shows a direct exchange between UEs 107*a* and 107*b* using their own built-in tags. As described in FIG. 7, the validation module 213 verifies tuples of privacy policies of UE 107*a* and 107*b* and finds similarities (intersections) between the policies. The list generator 221 may then generates lists of active privacy policies and construct a Privacy Information Space (PIS) based on the generated lists. Subsequently, the PIS can be stored in storage 223 for further reference and use.

FIG. 9B shows an embodiment, wherein privacy protected data is being exchanged between UEs 107*c* and 107*d* via a storage-only memory tag 107*g* without a privacy mechanism. In this embodiment the data exchange may be performed in two steps where in first step the tuples of privacy policies are exchanged via the tag 107*g* and the actual exchanged data is exchanged in a second step.

In one embodiment, the privacy policies associated with the exchanged data is provided as the intersection of privacy policies for UEs 107*c* and 107*d* by the privacy policy management infrastructure 103, as discussed in FIG. 7. As seen in FIG. 9B, the UE 107*c* transmits the privacy tuples to tag 107*g* per step 917 and the actual data per step 919. Similarly, the UE 107*d* accesses the privacy tuples per step 921 and the actual data per step 923. The order in which the steps 917-923 are performed is important in the sense that if the UE 107*d* attempts to access the data before accessing the privacy tuples the access will be denied.

In another embodiment, the privacy tuples provided to memory tag 107*a* in step 917 may be verified by UE 107*d* prior to data exchange. In this embodiment, the privacy policy tuples associated with the data are sent to the memory tag 107*g* per step 917. In step 921 the memory tag 107*g* sends the tuples to UE 107*d* for approval. If the privacy policies presented by tuples are not accepted by UE 107*d*, UE 107*d* may request for updated tuples. The memory tag 107*g* may forward the request to UE 107*a*. The tuple verification process by UE 107*d* may be repeated until the privacy tuples are accepted based on privacy policies of UE 107*d*. Following the approval of the privacy tuples the data can be transmitted to UE 107*d* from memory tag 107*g*.

FIG. 9C shows an embodiment wherein privacy protected data is being exchanged between UEs 107e and 107f via privacy tag 107h capable of exchanging privacy mechanisms. In one embodiment, the UE 107e may grant access to the exchanged data by UE 107f for a certain period of time (5 minutes, 2 hours, one month, etc.) or for a certain number of times (1, 2, . . . , n). The temporary allowance can be imposed via privacy tuples. For example, a token can be marked as a single use token that expires after the first use. In this embodiment. UE 107f can access the data from tag 107h only once. Any further attempts by UE 107f for accessing data may fail.

Figure 10:
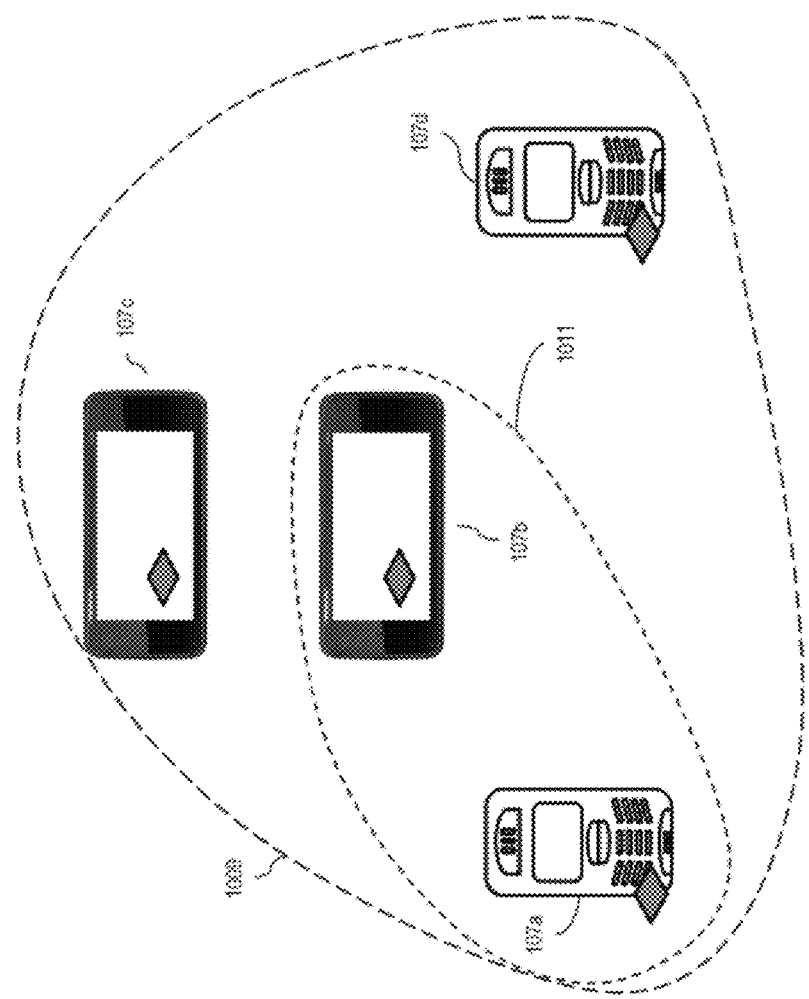
FIG. 10 is a diagram of levels of visibility of data based on token mechanism, according to one embodiment.

FIG. 10 is a diagram of levels of visibility of data based on token mechanism, according to one embodiment. Assuming that UEs 107a, 107b, 107c, and 107d have privacy policy sets A, B, C, and D associated with them, respectively. In one embodiment, the privacy policy management infrastructure 103 receives sets A, B, C, D, validates the sets and generates a Policy Information Space (PIS) P by combining the received sets together wherein P=A∪B∪C∪D Subsequently, upon receiving a request for data exchange between UEs 107a, 107c, and 107d the privacy policy management infrastructure 103 extracts the intersection of related policy sets A, C, and D, as shown by area 1009. Similarly, area 1011 represents the intersection between sets A and B the privacy sets for UEs 107a and 107b. It is noted that a set of privacy policies, as referred to here, is applied on devices that exchange structured data not the set of privacy policy defined, for example, for an information space.

In one embodiment, in order to extract the intersection of policy sets, the validation module 213 may, compare each policy token of a set (e.g., A) with all the tokens of other sets B, C, or D. If any contradiction is detected the token is not considered a common token, otherwise the token is added to a set of common tokens such as area 1009.

In one embodiment, based on policy intersections, a data element from UE 107a may be visible to UE 107b but not visible to neither of UEs 107c or 107d.

Figure 11:
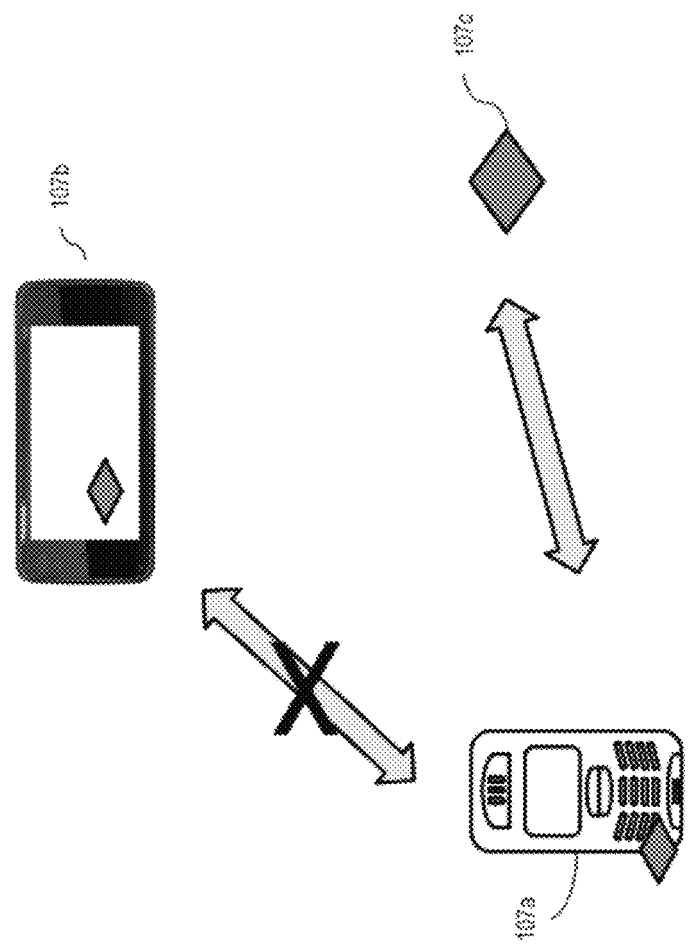
FIG. 11 is a diagram of invalidation and rejection of disposable policies, according to one embodiment.

FIG. 11 is a diagram of invalidation and rejection of disposable policies, according to one embodiment. In various embodiments, each UE 107 or each PIS may contain multiple privacy policies. In one embodiment, a user may wish to remove a policy, invalidate the policy after a certain period of time, invalidate the policy when a certain condition is met, or destroy the policy token after every usage.

In yet another embodiment, the user of a UE 107b may utilize a one-time tuple, a single use token, or a disposable token or privacy setting. In this case the privacy policy management infrastructure 103 may generate an initial list of privacy tokens of various levels for UE 107b and store them to tag 107c. The list may include disposable tokens, single use tokens, multiple use tokens, permanent tokens, conditional tokens, time sensitive tokens, etc. The privacy layer in tag 107c may encrypt the exchanged data with a In another embodiment, a user may wish to invalidate a token for a certain device while leaving it valid for other devices. For example, the user of UE 107a which is exchanging data with UE 107b and tag 107c may, at some point, decide to invalidate the policy token for UE 107b but continue the exchange with tag 107c.

Figure 12:
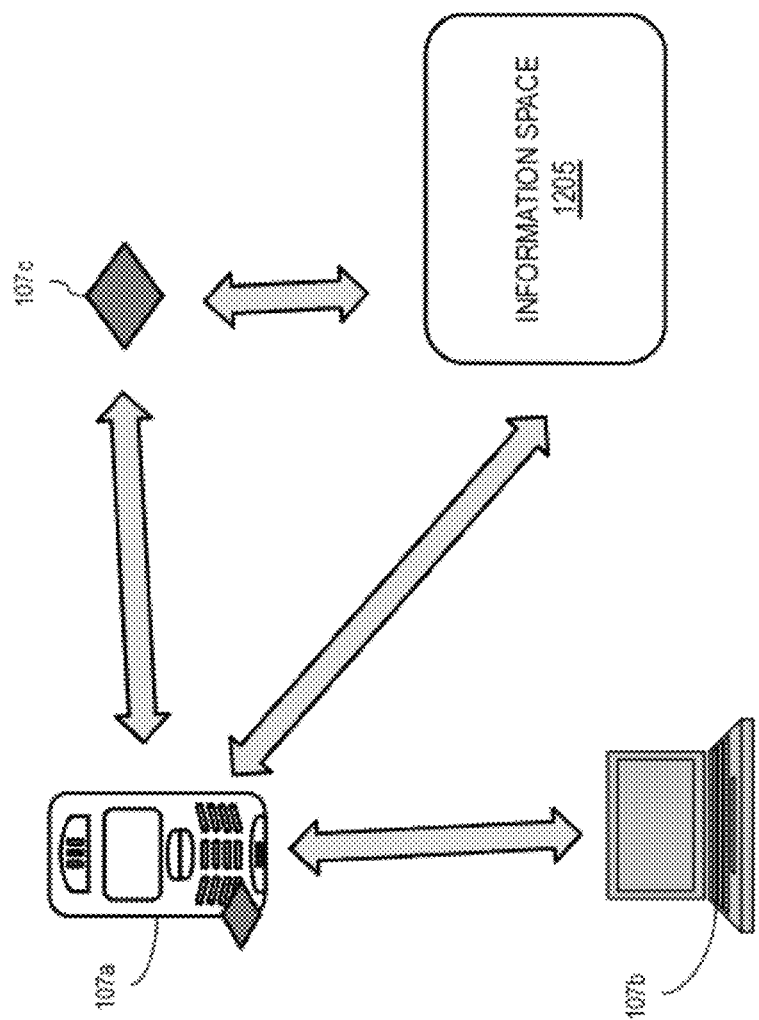
FIG. 12 is a diagram of privacy delegation, according to one embodiment.

FIG. 12 is a diagram of privacy delegation, according to one embodiment. In one embodiment device privacy policy enforcement can be delegated to other devices. For example, for passive tag 107c with no resources for privacy processing, its content privacy can be managed by information space 1205. Similarly, the UE 107a may delegate its privacy enforcement to UE 107b.

In one embodiment, the UE 107a with privacy policy set A may transfer its privacy policy A to UE 107b after signing the policy and authorizing UE 107b to act as its delegate for enforcing the policies from set A on any data exchange from UE 107a.

Device privacy policies may be signed to the device hardware, or software, content image. In one embodiment, multiple images of the same device, with privacy policies attached to them, may be created. The images may be stored in the information space 1205 to act as virtual machines simulating the original device.

Figure 13:
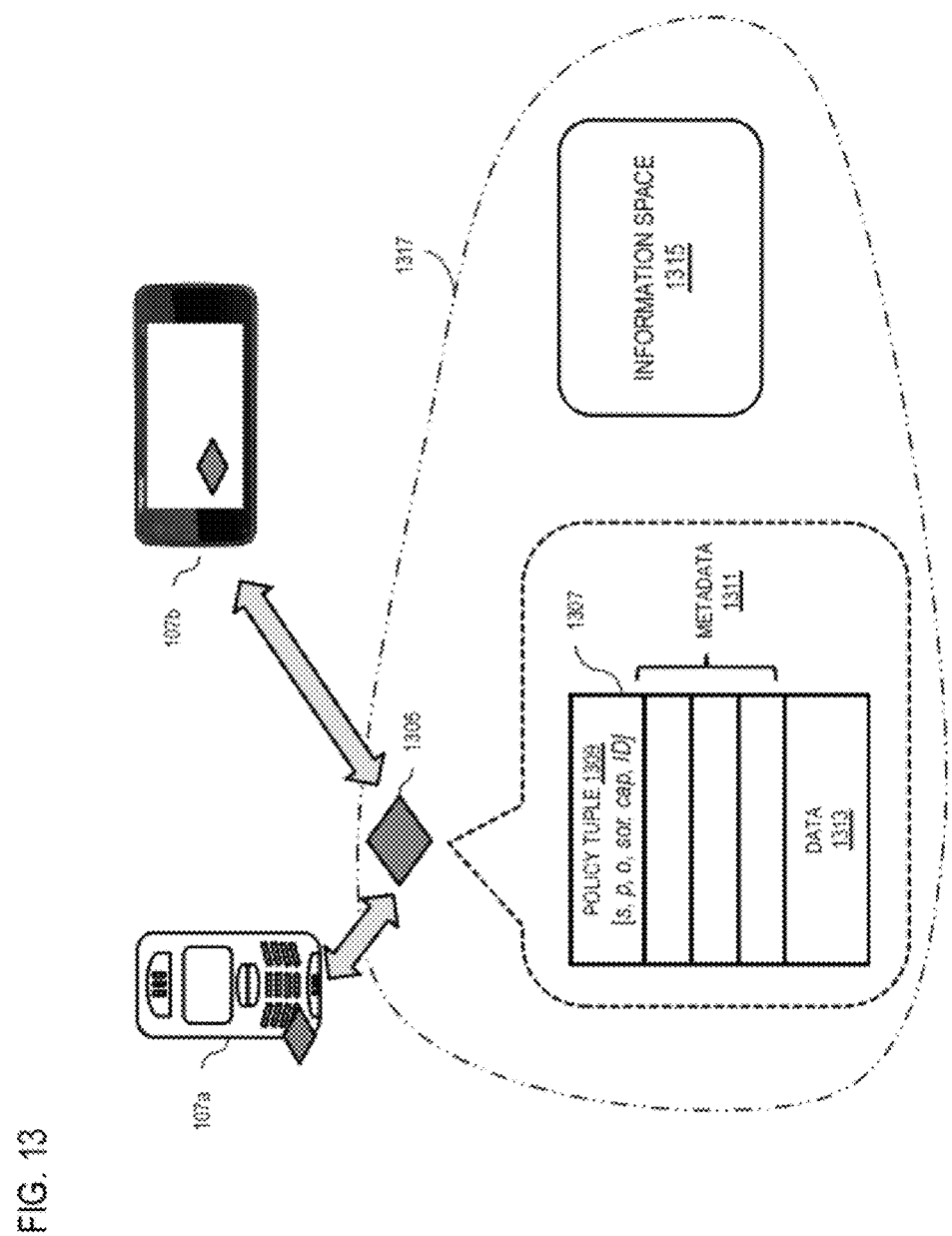
FIG. 13 is a diagram of privacy principles for information spaces, according to one embodiment.

FIG. 13 is a diagram of privacy principles for information spaces, according to one embodiment. In one embodiment privacy policies can be managed within the environment of one or more information spaces. In this embodiment the privacy policy management infrastructure 103 is included within the information space environment. The privacy policy management infrastructure 103 may maintain a list of tags which indicates which data elements are being exchanged with which tags and what privacy policies are applied to them. As seen in FIG. 13 tag 1305 is managed by the information space 1315, wherein the content of tag 1305 is considered as part of the information space environment 1317. Any attempt by UEs 107a or 107b for accessing the content of tag 1305 is verified and approved by the information space 1315 before access is granted.

In one embodiment, if tag content 1313 is modified after data with assigned privacy policy from a user is delivered to the information space 1315, a warning is sent to the original content owner and the tag owner that content 1313 has been modified and may have updated privacy policy. Alternatively, the level of privacy policy can be adjusted based on the content update.

Figure 14:
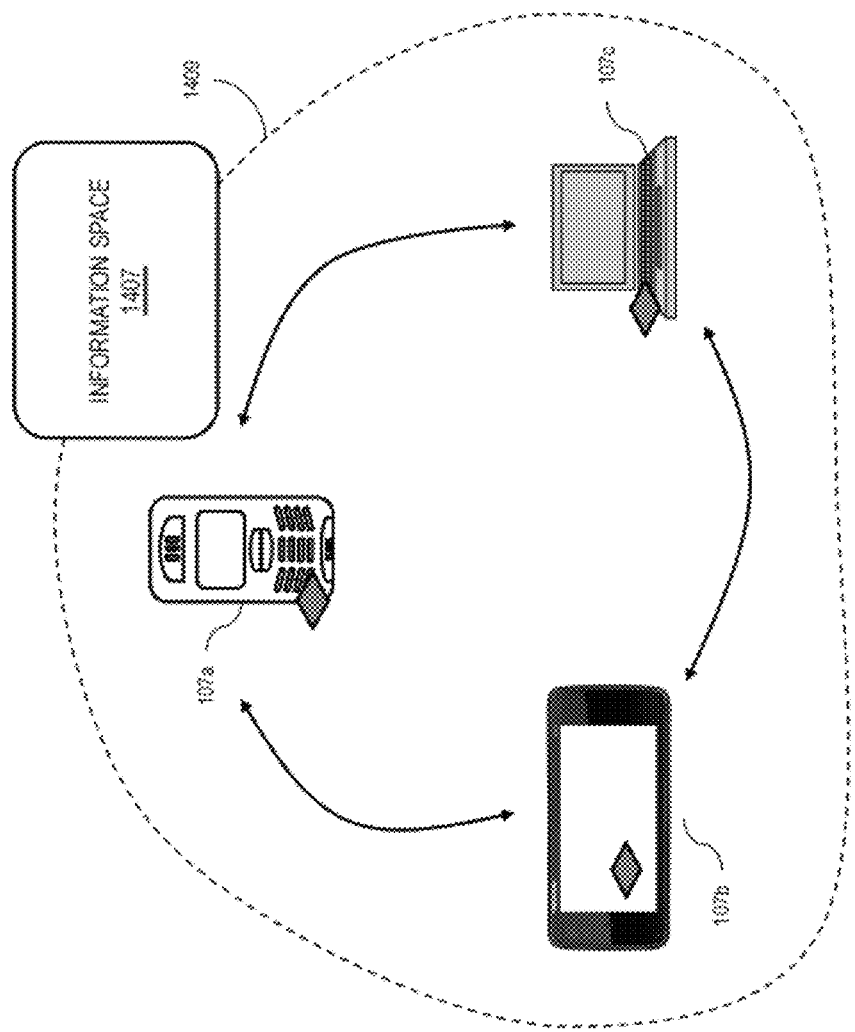
FIG. 14 is a diagram of privacy settings for information spaces, according to one embodiment.

FIG. 14 is a diagram of privacy settings for information spaces, according to one embodiment. In one embodiment, data exchange between UEs 107a, 107b and 107c can be managed by the information space 1407. In this embodiment, various privacy rules may be defined and assigned to the data, for example a "screen touch privacy rule" may define what elements of the data are sharable between any two of the UEs 107a, 107b, and 107c within the environment 1409 of information space 1407 during the time when a screen touch happens. Additionally, the privacy rule may define what elements of data are not sharable during a touch period. Additionally, different privacy policies may be assigned based on whether screen touch or other radio interfaces are used. For example, a policy may indicate that for screen touch a privacy policy A is to be used while other local interfaces should use privacy policy B.

Other examples of privacy policies that may be considered for a touch period are portion or entire information space of active and passive privacy rules being visible during the touch (or during data transmission to or form a tag), asking for more credentials for access to specific content (e.g. visibility) for certain privacy settings to be released for that case (i.e. credentials for content visibility in a specific UE).

In one embodiment, privacy rules may include possibility to tunnel the data streams without visibility of the data in the intermediate device, within particular information spaces with more credentials, or between information spaces. In other embodiments, the data may be tunneled with limited visibility, or tunneled with certain access rights for the target, intermediate device and/or other endpoints for that particular data which may be relayed, streamed, or transferred as files.

The processes described herein for applying privacy policies to structured data may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 15:
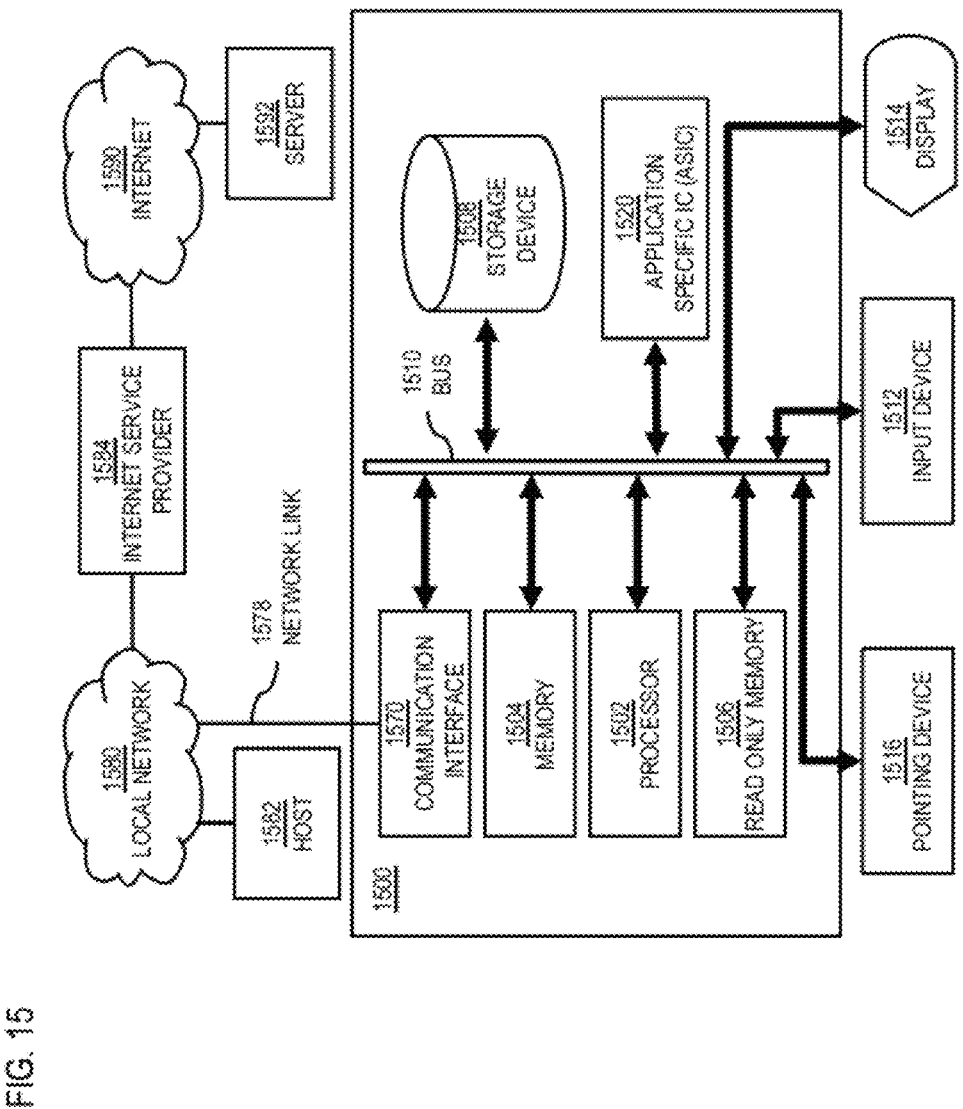
FIG. 15 is a diagram of hardware that can be used to implement an embodiment of the invention.

FIG. 15 illustrates a computer system 1500 upon which an embodiment of the invention may be implemented. Although computer system 1500 is depicted with respect to a particular device or equipment, it is contemplated that other devices or equipment (e.g., network elements, servers, etc.) within FIG. 15 can deploy the illustrated hardware and components of system 1500. Computer system 1500 is programmed (e.g., via computer program code or instructions) to apply privacy policies to structured data as described herein and includes a communication mechanism such as a bus 1510 for passing information between other internal and external components of the computer system 1500. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1500, or a portion thereof, constitutes a means for performing one or more steps of applying privacy policies to structured data.

A bus 1510 includes one or more parallel conductors of information so that information is transferred quickly among devices coupled to the bus 1510. One or more processors 1502 for processing information are coupled with the bus 1510.

A processor (or multiple processors) 1502 performs a set of operations on information as specified by computer program code related to applying privacy policies to structured data. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1510 and placing information on the bus 1510. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1502, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1500 also includes a memory 1504 coupled to bus 1510. The memory 1504, such as a random access memory (RAM) or other dynamic storage device, stores information including processor instructions for applying privacy policies to structured data. Dynamic memory allows information stored therein to be changed by the computer system 1500. RAM allows a unit of information stored at a location called a memory address to be stored and retrieved independently of information at neighboring addresses. The memory 1504 is also used by the processor 1502 to store temporary values during execution of processor instructions. The computer system 1500 also includes a read only memory (ROM) 1506 or other static storage device coupled to the bus 1510 for storing static information, including instructions, that is not changed by the computer system 1500. Some memory is composed of volatile storage that loses the information stored thereon when power is lost. Also coupled to bus 1510 is a non-volatile (persistent) storage device 1508, such as a magnetic disk, optical disk or flash card, for storing information, including instructions, that persists even when the computer system 1500 is turned off or otherwise loses power.

Information, including instructions for applying privacy policies to structured data, is provided to the bus 1510 for use by the processor from an external input device 1512, such as a keyboard containing alphanumeric keys operated by a human user, or a sensor. A sensor detects conditions in its vicinity and transforms those detections into physical expression compatible with the measurable phenomenon used to represent information in computer system 1500. Other external devices coupled to bus 1510, used primarily for interacting with humans, include a display device 1514, such as a cathode ray tube (CRT) or a liquid crystal display (LCD), or plasma screen or printer for presenting text or images, and a pointing device 1516, such as a mouse or a trackball or cursor direction keys, or motion sensor, for controlling a position of a small cursor image presented on the display 1514 and issuing commands associated with graphical elements presented on the display 1514. In some embodiments, for example, in embodiments in which the computer system 1500 performs all functions automatically without human input, one or more of external input device 1512, display device 1514 and pointing device 1516 is omitted.

In the illustrated embodiment, special purpose hardware, such as an application specific integrated circuit (ASIC) 1520, is coupled to bus 1510. The special purpose hardware is configured to perform operations not performed by processor 1502 quickly enough for special purposes. Examples of application specific ICs include graphics accelerator cards for generating images for display 1514, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1500 also includes one or more instances of a communications interface 1570 coupled to bus

1510. Communication interface 1570 provides a one-way or two-way communication coupling to a variety of external devices that operate with their own processors, such as printers, scanners and external disks. In general the coupling is with a network link 1578 that is connected to a local network 1580 to which a variety of external devices with their own processors are connected. For example, communication interface 1570 may be a parallel port or a serial port or a universal serial bus (USB) port on a personal computer. In some embodiments, communications interface 1570 is an integrated services digital network (ISDN) card or a digital subscriber line (DSL) card or a telephone modem that provides an information communication connection to a corresponding type of telephone line. In some embodiments, a communication interface 1570 is a cable modem that converts signals on bus 1510 into signals for a communication connection over a coaxial cable or into optical signals for a communication connection over a fiber optic cable. As another example, communications interface 1570 may be a local area network (LAN) card to provide a data communication connection to a compatible LAN, such as Ethernet. Wireless links may also be implemented. For wireless links, the communications interface 1570 sends or receives or both sends and receives electrical, acoustic or electromagnetic signals, including infrared and optical signals, that carry information streams, such as digital data. For example, in wireless handheld devices, such as mobile telephones like cell phones, the communications interface 1570 includes a radio band electromagnetic transmitter and receiver called a radio transceiver. In certain embodiments, the communications interface 1570 enables connection to the communication network 105 for providing application of privacy policies to structured data to the UE set 101.

The term "computer-readable medium" as used herein refers to any medium that participates in providing information to processor 1502, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1508. Volatile media include, for example, dynamic memory 1504. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1520.

Network link 1578 typically provides information communication using transmission media through one or more networks to other devices that use or process the information. For example, network link 1578 may provide a connection through local network 1580 to a host computer 1582 or to equipment 1584 operated by an Internet Service Provider (ISP). ISP equipment 1584 in turn provides data communication services through the public, world-wide packet-switching communication network of networks now commonly referred to as the Internet 1590.

A computer called a server host 1592 connected to the Internet hosts a process that provides a service in response to information received over the Internet. For example, server host 1592 hosts a process that provides information representing video data for presentation at display 1514. It is contemplated that the components of system 1500 can be deployed in various configurations within other computer systems, e.g., host 1582 and server 1592.

At least some embodiments of the invention are related to the use of computer system 1500 for implementing some or all of the techniques described herein. According to one embodiment of the invention, those techniques are performed by computer system 1500 in response to processor 1502 executing one or more sequences of one or more processor instructions contained in memory 1504. Such instructions, also called computer instructions, software and program code, may be read into memory 1504 from another computer-readable medium such as storage device 1508 or network link 1578. Execution of the sequences of instructions contained in memory 1504 causes processor 1502 to perform one or more of the method steps described herein. In alternative embodiments, hardware, such as ASIC 1520, may be used in place of or in combination with software to implement the invention. Thus, embodiments of the invention are not limited to any specific combination of hardware and software, unless otherwise explicitly stated herein.

The signals transmitted over network link 1578 and other networks through communications interface 1570, carry information to and from computer system 1500. Computer system 1500 can send and receive information, including program code, through the networks 1580, 1590 among others, through network link 1578 and communications interface 1570. In an example using the Internet 1590, a server host 1592 transmits program code for a particular application, requested by a message sent from computer 1500, through Internet 1590, ISP equipment 1584, local network 1580 and communications interface 1570. The received code may be executed by processor 1502 as it is received, or may be stored in memory 1504 or in storage device 1508 or other non-volatile storage for later execution, or both. In this manner, computer system 1500 may obtain application program code in the form of signals on a carrier wave.

Various forms of computer readable media may be involved in carrying one or more sequence of instructions or data or both to processor 1502 for execution. For example, instructions and data may initially be carried on a magnetic disk of a remote computer such as host 1582. The remote computer loads the instructions and data into its dynamic memory and sends the instructions and data over a telephone line using a modem. A modem local to the computer system 1500 receives the instructions and data on a telephone line and uses an infra-red transmitter to convert the instructions and data to a signal on an infra-red carrier wave serving as the network link 1578. An infrared detector serving as communications interface 1570 receives the instructions and data carried in the infrared signal and places information representing the instructions and data onto bus 1510. Bus 1510 carries the information to memory 1504 from which processor 1502 retrieves and executes the instructions using some of the data sent with the instructions. The instructions and data received in memory 1504 may optionally be stored on storage device 1508, either before or after execution by the processor 1502.

FIG. 16 illustrates a chip set or chip 1600 upon which an embodiment of the invention may be implemented. Chip set 1600 is programmed to apply privacy policies to structured data as described herein and includes, for instance, the processor and memory components described with respect to FIG. 15 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1600 can be implemented in a single chip. It is further contemplated that in certain embodiments the chip set or chip 1600 can be implemented as a single "system on a chip." It is further contemplated that in certain embodiments a separate ASIC would not be used, for example, and that all relevant functions as disclosed herein would be performed by a processor or processors. Chip set or chip 1600, or a portion thereof, constitutes a means for performing one or more steps of providing user interface navigation information associated with the availability of functions. Chip set or chip 1600, or a portion thereof, constitutes a means for performing one or more steps of applying privacy policies to structured data.

In one embodiment, the chip set or chip 1600 includes a communication mechanism such as a bus 1601 for passing information among the components of the chip set 1600. A processor 1603 has connectivity to the bus 1601 to execute instructions and process information stored in, for example, a memory 1605. The processor 1603 may include one or more processing cores with each core configured to perform independently. A multi-core processor enables multiprocessing within a single physical package. Examples of a multi-core processor include two, four, eight, or greater numbers of processing cores. Alternatively or in addition, the processor 1603 may include one or more microprocessors configured in tandem via the bus 1601 to enable independent execution of instructions, pipelining, and multithreading. The processor 1603 may also be accompanied with one or more specialized components to perform certain processing functions and tasks such as one or more digital signal processors (DSP) 1607, or one or more application-specific integrated circuits (ASIC) 1609. A DSP 1607 typically is configured to process real-world signals (e.g., sound) in real time independently of the processor 1603. Similarly, an ASIC 1609 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1600 includes merely one or more processors and some software and/or firmware supporting and/or relating to and/or for the one or more processors.

The processor 1603 and accompanying components have connectivity to the memory 1605 via the bus 1601. The memory 1605 includes both dynamic memory (e.g., RAM, magnetic disk, writable optical disk, etc.) and static memory (e.g., ROM, CD-ROM, etc.) for storing executable instructions that when executed perform the inventive steps described herein to application of privacy policies to structured data. The memory 1605 also stores the data associated with or generated by the execution of the inventive steps.

Figure 17:
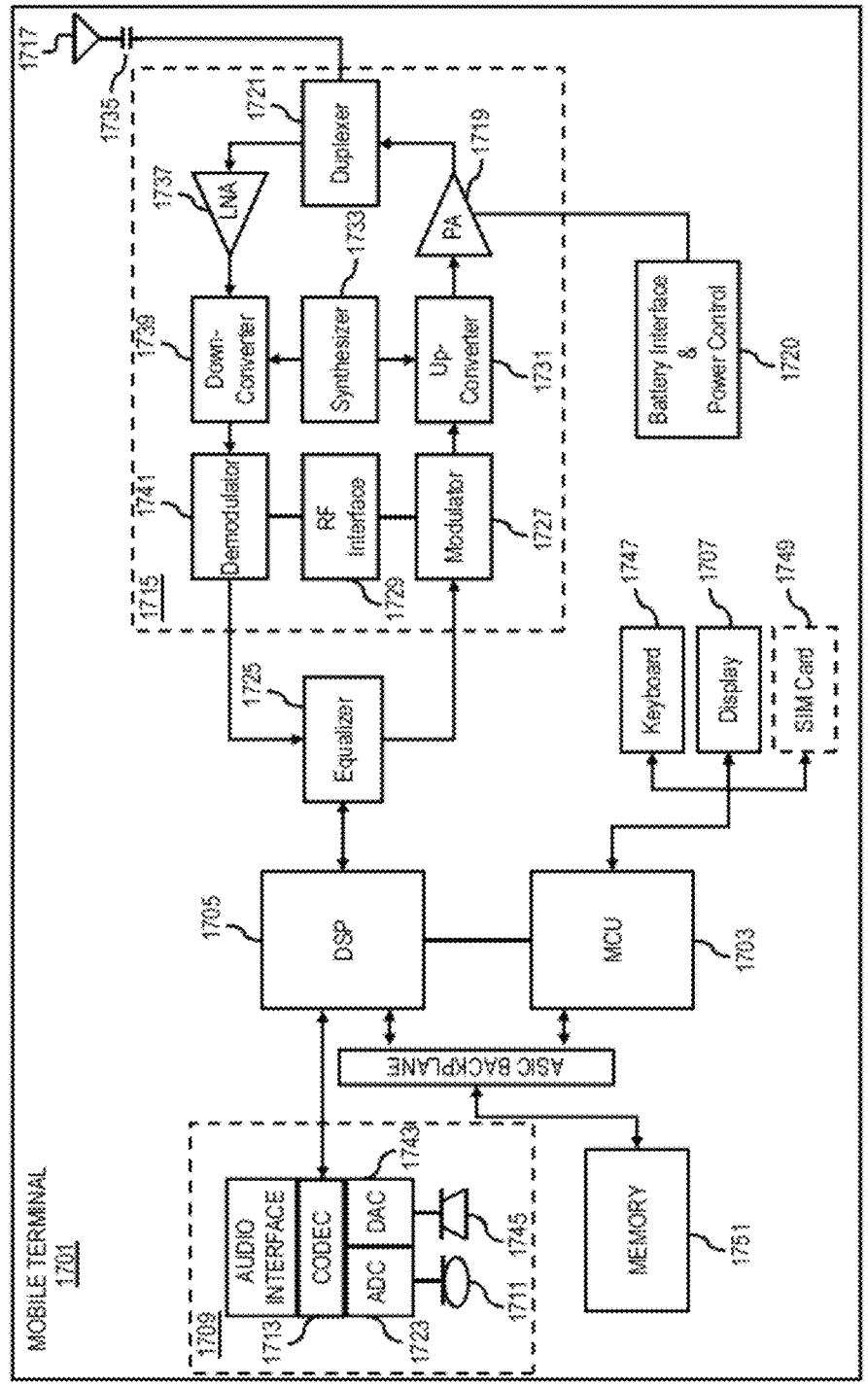
FIG. 17 is a diagram of a mobile terminal (e.g., handset) that can be used to implement an embodiment of the invention.

FIG. 17 is a diagram of exemplary components of a mobile terminal (e.g., handset) for communications, which is capable of operating in the system of FIG. 1, according to one embodiment. In some embodiments, mobile terminal 1701, or a portion thereof, constitutes a means for performing one or more steps of applying privacy policies to structured data. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1703, a Digital Signal Processor (DSP) 1705, and a receiver/transmitter unit including a microphone gain control unit and a speaker gain control unit. A main display unit 1707 provides a display to the user in support of various applications and mobile terminal functions that perform or support the steps of applying privacy policies to structured data. The display 1707 includes display circuitry configured to display at least a portion of a user interface of the mobile terminal (e.g., mobile telephone). Additionally, the display 1707 and display circuitry are configured to facilitate user control of at least some functions of the mobile terminal. An audio function circuitry 1709 includes a microphone 1711 and microphone amplifier that amplifies the speech signal output from the microphone 1711. The amplified speech signal output from the microphone 1711 is fed to a coder/decoder (CODEC) 1713.

A radio section 1715 amplifies power and converts frequency in order to communicate with a base station, which is included in a mobile communication system, via antenna 1717. The power amplifier (PA) 1719 and the transmitter/modulation circuitry are operationally responsive to the MCU 1703, with an output from the PA 1719 coupled to the duplexer 1721 or circulator or antenna switch, as known in the art. The PA 1719 also couples to a battery interface and power control unit 1720.

In use, a user of mobile terminal 1701 speaks into the microphone 1711 and his or her voice along with any detected background noise is converted into an analog voltage. The analog voltage is then converted into a digital signal through the Analog to Digital Converter (ADC) 1723. The control unit 1703 routes the digital signal into the DSP 1705 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 1725 for compensation of any frequency-dependent impairments that occur during transmission though the air such as phase and amplitude distortion. After equalizing the bit stream, the modulator 1727 combines the signal with a RF signal generated in the RF interface 1729. The modulator 1727 generates a sine wave by way of frequency or phase modulation. In order to prepare the signal for transmission, an up-converter 1731 combines the sine wave output from the modulator 1727 with another sine wave generated by a synthesizer 1733 to achieve the desired frequency of transmission. The signal is then sent through a PA 1719 to increase the signal to an appropriate power level. In practical systems, the PA 1719 acts as a variable gain amplifier whose gain is controlled by the DSP 1705 from information received from a network base station. The signal is then filtered within the duplexer 1721 and optionally sent to an antenna coupler 1735 to match impedances to provide maximum power transfer. Finally, the signal is transmitted via antenna 1717 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 1701 are received via antenna 1717 and immediately amplified by a low noise amplifier (LNA) 1737. A down-converter 1739 lowers the carrier frequency while the demodulator 1741 strips away the RF leaving only a digital bit stream. The signal then goes through the equalizer 1725 and is processed by the DSP 1705. A Digital to Analog Converter (DAC) 1743 converts the signal and the resulting output is transmitted to the user through the speaker 1745, all under control of a Main Control Unit (MCU) 1703—which can be implemented as a Central Processing Unit (CPU).

The MCU 1703 receives various signals including input signals from the keyboard 1747. The keyboard 1747 and/or the MCU 1703 in combination with other user input components (e.g., the microphone 1711) comprise a user interface circuitry for managing user input. The MCU 1703 runs a user interface software to facilitate user control of at least some functions of the mobile terminal 1701 to provide application of privacy policies to structured data. The MCU 1703 also delivers a display command and a switch command to the display 1707 and to the speech output switching controller, respectively. Further, the MCU 1703 exchanges information with the DSP 1705 and can access an optionally incorporated SIM card 1749 and a memory 1751. In addition, the MCU 1703 executes various control functions required of the terminal. The DSP 1705 may, depending upon the implementation, perform any of a variety of conventional digital processing functions on the voice signals. Additionally, DSP 1705 determines the background noise level of the local environment from the signals detected by microphone 1711 and sets the gain of microphone 1711 to a level selected to compensate for the natural tendency of the user of the mobile terminal 1701.

The CODEC 1713 includes the ADC 1723 and DAC 1743. The memory 1751 stores various data including call incoming tone data and is capable of storing other data including music data received via, e.g., the global Internet. The software module could reside in RAM memory, flash memory, registers, or any other form of writable storage medium known in the art. The memory device 1751 may be, but not limited to, a single memory, CD, DVD, ROM, RAM, EEPROM, optical storage, or any other non-volatile storage medium capable of storing digital data.

An optionally incorporated SIM card 1749 carries, for instance, important information, such as the cellular phone number, the carrier supplying service, subscription details, and security information. The SIM card 1749 serves primarily to identify the mobile terminal 1701 on a radio network. The card 1749 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   receiving, by an apparatus, a request for transmitting structured data from a radio-frequency memory tag to a user device, wherein the user device has at least one internal memory;
   determining, by the apparatus, elements of the structured data stored in the radio-frequency memory tag;
   determining, by the apparatus, one or more privacy policies including one or more privacy levels corresponding to one or more of the elements; and
   applying, by the apparatus, the one or more privacy policies to the one or more of the elements, when initiating a transmission from the radio-frequency memory tag to the user device, by using one or more filters, one or more tokens, or a combination thereof, corresponding to the one or more privacy policies,
   wherein the applying of the one or more privacy policies comprises at least one of masking, encrypting, and removing one or more elements from the one or more of the elements before the transmission from the radio-frequency memory tag to the user device.

2. A method of claim 1,
   wherein the apparatus is embedded in the user device, the radio-frequency memory tag, a server connecting with the user device via a network, or a combination thereof.

3. A method of claim 2, further comprising:
   serializing at least a portion of the one or more privacy policies as one or more tuples,
   wherein the one or more tuples represent the one or more tokens,
   wherein the radio-frequency tag includes one or more passive radio-frequency identification tags, one or more active radio-frequency identification tags, or a combination thereof, and
   wherein the transmission occurs, at least in part, over radio-frequency communication.

4. A method of claim 2, further comprising:
validating the one or more tokens; and
granting access to the structured data, the one or more of the elements, or a combination thereof based, at least in part, on the validation,
wherein each of the tokens is for a single use.

5. A method of claim 2, further comprising:
performing a comparison of at least one of the one or more tokens associated with the user device and at least another one of the one or more tokens associated with one or more other user devices; and
determining access to the structured data, the one or more of the elements, or a combination thereof based, at least in part, on the comparison,
wherein the at least one internal memory includes at least one operating system memory and at least one other internal memory, and the one or more privacy policies include different privacy levels corresponding to respective ones of the elements stored in the at least one operating system memory and the at least one other internal memory.

6. A method of claim 1, wherein the request further specifies an intermediate device, the method further comprising:
applying the one or more privacy policies to initiate tunneling of the structured data, the one or more of the elements, or a combination thereof through the intermediate device to facilitate the transmission.

7. A method of claim 6, wherein the one or more privacy policies are applied via at least one of:
filtering at least one of the one or more of the elements from the transmission based, at least in part, on the one or more privacy policies; and
annotating at least one of the one or more of the elements based, at least in part, on the one or more privacy policies,
wherein the one or more of the elements include data of owner information, source information, keys access key information, encryption key information, decryption key information, or a combination thereof.

8. A method of claim 1, further comprising:
initiating a transmission of at least one of the one or more privacy policies to the user device separately from the transmission,
wherein the one or more privacy levels include visible clear, anonymous information clear, sensitive clear, sensitive not shown, not visible, or a combination thereof.

9. A method of claim 1, wherein at least one of the one or more privacy policies is associated with a list of participating devices, the method further comprising:
determining whether the user device is on the list,
wherein the transmission is based, at least in part, on the determination with respect to the list.

10. A method of claim 1, further comprising:
receiving feedback information from the user device regarding application of at least one of the one or more privacy policies, the transmission, or a combination thereof,
wherein the one or more privacy policies include different privacy levels corresponding to the one or more of the elements stored in the radio-frequency memory tag respectively.

11. A method of claim 1, wherein the one or more privacy policies are applied at a protocol stack layer, a physical layer, or a combination thereof of the transmission.

12. A method of claim 1, further comprising:
associating the one or more tokens with the structured data, the one or more of the elements, or a combination thereof,
wherein the one or more privacy policies are applied to the one or more of the elements, when the transmission is initiated by verifying content of the one or more tokens and handling the one or more of the elements based on the content.

13. A method of claim 1, wherein the one or more privacy policies include one or more active privacy policy rules and one or more passive privacy policy rules corresponding to the radio-frequency memory tag, the one or more active privacy policy rules are active to the radio-frequency memory tag, and the one or more passive privacy policy rules will be activated to the radio-frequency memory tag based on one or more conditions, and
wherein the user device encrypts the one or more of the elements stored in the radio-frequency memory tag based on the one or more active privacy policy rules.

14. An apparatus comprising:
at least one processor; and
at least one memory including computer program code for one or more programs,
the at least one memory and the computer program code configured to, with the at least one processor, cause the apparatus to perform at least the following,
receive a request for transmitting structured data from a radio-frequency memory tag to a user device, wherein the user device has at least one internal memory;
determine elements of the structured data stored in the radio-frequency memory tag;
determine one or more privacy policies including one or more privacy levels corresponding to one or more of the elements; and
apply the one or more privacy policies to the one or more of the elements, when initiating a transmission from the radio-frequency memory tag to the user device, by using one or more filters, one or more tokens, or a combination thereof, corresponding to the one or more privacy policies,
wherein the applying of the one or more privacy policies comprises at least one of masking, encrypting, and removing one or more elements from the one or more of the elements before the transmission from the radio-frequency memory tag to the user device.

15. An apparatus of claim 14,
wherein the apparatus is embedded in the user device, the radio-frequency memory tag, a server connecting with the user device via a network, or a combination thereof.

16. An apparatus of claim 15, wherein the apparatus is further caused to:
serialize at least a portion of the one or more privacy policies as one or more tuples, wherein the one or more tuples represent the one or more tokens,
wherein the radio-frequency tag includes one or more passive radio-frequency identification tags, one or more active radio-frequency identification tags, or a combination thereof, and
wherein the transmission occurs, at least in part, over radio-frequency communication.

17. An apparatus of claim 15, wherein the apparatus is further caused to:
validate the one or more tokens; and
grant access to the structured data, the one or more of the elements, or a combination thereof based, at least in part, on the validation,
wherein each of the tokens is for a single use.

18. A method comprising:
receiving, by an apparatus, a request for transmitting structured data from a radio-frequency memory tag to a user device, wherein the user device has at least one internal memory;
determining, by the apparatus, elements of the structured data stored in the radio-frequency memory tag;
determining, by the apparatus, one or more privacy policies including one or more privacy levels corresponding to one or more of the elements; and
applying, by the apparatus, the one or more privacy policies to the one or more of the elements, when initiating the transmission from the radio-frequency memory tag to the user device; and
initiating, by the apparatus, an adjustment of at least one of the one or more privacy levels associated with the one or more of the elements for the radio-frequency memory tag based on one or more modification to the one or more of the elements, after the one or more of the elements is stored in the radio-frequency memory tag,
wherein the applying of the one or more privacy policies comprises at least one of masking, encrypting, and removing one or more elements from the one or more of the elements before the transmission from the radio-frequency memory tag to the user device.

19. A method of claim 18, further comprising:
initiating a transmission of a notification of the one or more modification to the one or more of the elements to an owner of the one or more of the elements, an owner of the radio-frequency memory tag, or a combination thereof.

20. A method of claim 18, further comprising:
initiating a transmission of a notification of the adjustment of the one privacy level to an owner of the one or more of the elements, an owner of the radio-frequency memory tag, or a combination thereof.

* * * * *